US012683075B2

(12) United States Patent
Jeong et al.

(10) Patent No.: US 12,683,075 B2
(45) Date of Patent: Jul. 14, 2026

(54) DIELECTRIC MATERIAL, DEVICE INCLUDING THE SAME, AND METHOD OF PREPARING THE DIELECTRIC MATERIAL

(71) Applicant: Samsung Electronics Co., Ltd., Suwon-si (KR)

(72) Inventors: Taewon Jeong, Yongin-si (KR); Hyeon Cheol Park, Hwaseong-si (KR); Daejin Yang, Seoul (KR); Doh Won Jung, Seoul (KR); Giyoung Jo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 976 days.

(21) Appl. No.: 17/750,742

(22) Filed: May 23, 2022

(65) Prior Publication Data

US 2023/0162917 A1     May 25, 2023

(30) Foreign Application Priority Data

Nov. 25, 2021     (KR) ......................... 10-2021-0164870

(51) Int. Cl.
| | |
|---|---|
| *H01G 4/10* | (2006.01) |
| *C01G 33/00* | (2006.01) |
| *H01G 4/008* | (2006.01) |
| *H01G 4/30* | (2006.01) |

(52) U.S. Cl.
CPC ............. *H01G 4/10* (2013.01); *C01G 33/006* (2013.01); *H01G 4/008* (2013.01); *H01G 4/30* (2013.01); *C01P 2002/50* (2013.01); *C01P 2002/72* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 774,227 A | 11/1904 | Beaver | |
| 7,742,278 B2 | 6/2010 | Takeda | |
| 2009/0290285 A1* | 11/2009 | Takeda | .................. C04B 35/495 |
| | | | 501/135 |

(Continued)

FOREIGN PATENT DOCUMENTS

| | | |
|---|---|---|
| CN | 110041074 A | 7/2019 |
| CN | 111484326 A | 8/2020 |
| KR | 10-2009-0108634 A | 10/2009 |

OTHER PUBLICATIONS

Huan-Chu Chen et al, "Growth and some properties of undoped and Doped (K1—xNax)0.4(Sr1—yBay)0.8Nb2O6(KNSBN)Single Crystals With Tungsten-Bronze Structure," Journal of Crystal Growth, 96(2), pp. 357-362, Jan. 23, 1989.

(Continued)

*Primary Examiner* — Jennifer A Smith
*Assistant Examiner* — Paul Alan Forsyth
(74) *Attorney, Agent, or Firm* — Harness, Dickey & Pierce, P.L.C.

(57) ABSTRACT

A dielectric material, a device including the same, and a method of preparing the dielectric material are provided. The dielectric material may include a compound represented by the following Formula 1:

$$K_{1+x}NaSr_{4-2x}La_xNb_{10}O_{30},$$   Formula 1 wherein, in Formula 1, 0<x<2.

25 Claims, 20 Drawing Sheets

(a)                    (b)                    (c)

(56) References Cited

U.S. PATENT DOCUMENTS

2018/0040424 A1 \* 2/2018 Takahashi ............... C04B 35/64
2022/0028613 A1 1/2022 Jeong et al.

OTHER PUBLICATIONS

M. Zriouil et al, "Structure, dielectric and spectroscopic investigation of (Sr1—xNax)0.8(K1-xLnx)0.4Nb2O6 With (Ln=Nd, Eu), "Physical & Chemical News 44, pp. 96-102, Nov. 2008.
Notice of Non-Final Rejection issued on Sep. 10, 2025 in Korean Application No. 10-2021-0164870.

\* cited by examiner

DIELECTRIC MATERIAL, DEVICE INCLUDING THE SAME, AND METHOD OF PREPARING THE DIELECTRIC MATERIAL

CROSS-REFERENCE TO RELATED APPLICATION

This application is based on and claims priority under 35 U.S.C. § 119 to Korean Patent Application No. 10-2021-0164870, filed on Nov. 25, 2021, in the Korean Intellectual Property Office, the disclosure of which is incorporated by reference herein in its entirety.

BACKGROUND

1. Field

The present disclosure relates to a dielectric material, a device including the same, and a method of preparing the dielectric material.

2. Description of the Related Art

As electronic products continue to become smaller and more powerful, more miniaturized capacitors having higher capacitance are needed. In order to provide a miniaturized, high-capacity capacitor, there is a need for a dielectric material with improved dielectric properties.

In order to produce a multi-layered ceramic capacitor (MLCC), which is a type of a miniaturized and high-capacity capacitor, a dielectric layer needs to be made thinner. However, an inevitable surge of the electric field may lead to a decrease in dielectric spontaneous polarization, and as a result, permittivity drops significantly. In addition, the need for a high-temperature dielectric material, e.g., for use in MLCC for vehicles and/or special purposes, is gradually increasing. Therefore, there is a demand for the development of a novel dielectric material that has improved permittivity under a high electric field and has a stability in high temperatures.

SUMMARY

An aspect is to provide a dielectric material having improved permittivity and stable temperature properties of permittivity under a high electric field at room temperature and a high temperature, and retaining an equivalent level of dielectric and temperature characteristics even when used under a redox atmosphere in a device.

Another aspect is to provide a device including the dielectric material.

Still another aspect is to provide a method of producing the dielectric material.

Additional aspects will be set forth in part in the description which follows and, in part, will be apparent from the description, or may be learned by practice of the presented embodiments of the disclosure.

According to an aspect, a dielectric material including a compound represented Formula 1 is provided:

$$K_{1+x}NaSr_{4-2x}La_xNb_{10}O_{30}, \qquad \text{Formula 1}$$

wherein $0 < x < 2$.

According to another aspect, a device includes: a plurality of electrodes; and a dielectric layer between the plurality of electrodes, wherein the dielectric layer includes the dielectric material.

According to still another aspect, a method of producing the dielectric material includes mechanically milling a mixture of potassium salts, sodium salts, strontium salts, niobium compounds, and lanthanum compounds; and heat-treating the mixture under an oxidizing atmosphere, wherein the dielectric material includes a compound represented by Formula 1:

$$K_{1+x}NaSr_{4-2x}La_xNb_{10}O_{30}, \qquad \text{Formula 1}$$

wherein $0 < x < 2$.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
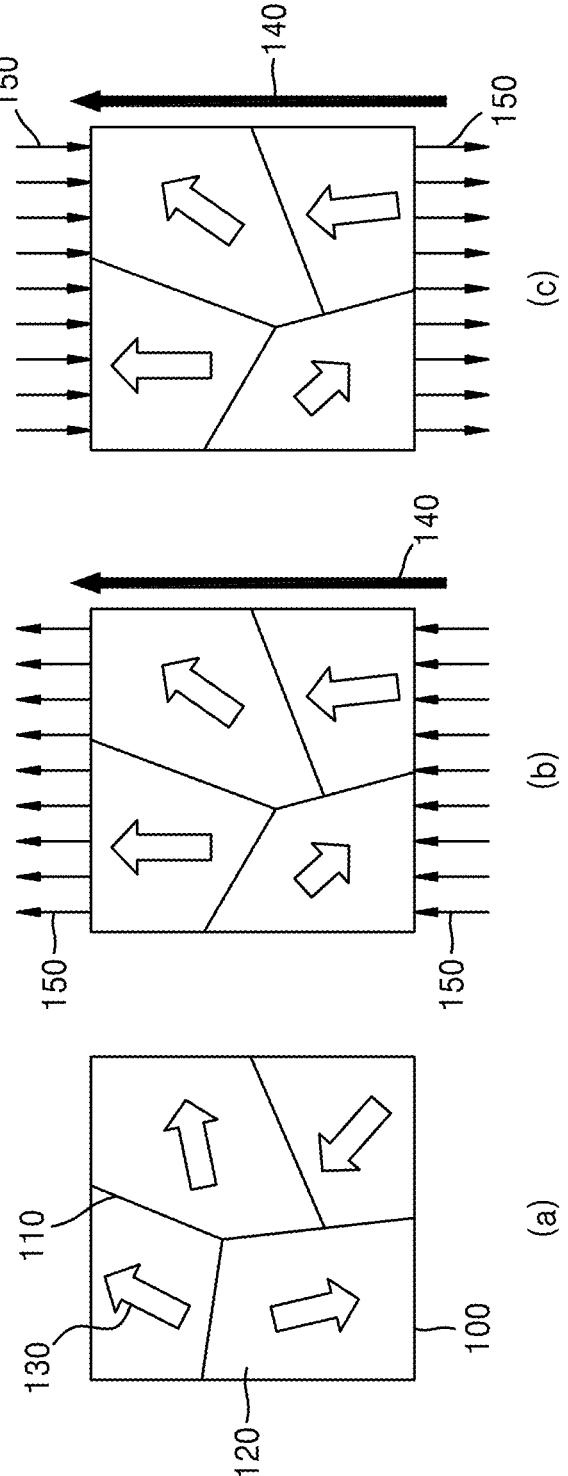
FIG. 1 is a conceptual diagram for explaining a case where spontaneous polarization in a thin film ferroelectric of the related art is fixed and thus permittivity is reduced.

Reference will now be made in detail to embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list.

Hereinafter, referring to the attached drawings, a more detailed description will be given below on a dielectric material according to some example embodiments of the present disclosure, a device including the dielectric material, and a method of manufacturing the dielectric material. The described herein are given as examples and the present disclosure is not limited thereto, but is only defined by the scope of the appended claims.

As used herein, the expressions "above" and/or "on" not only indicates the state that a thing is in contact with something else and directly above or on it, but also the state when a thing is above or on something else without a direct contact. Singular expressions include plural expressions unless the meanings are clearly different in the context. In addition, when a part "includes" a component, unless otherwise specified, it does not exclude other components but may further include other components. As used herein, the term "combination," unless otherwise specified, includes a mixture, alloy, reaction product, and/or the like.

As used herein, the used of numerical terms, such as "a(the) first," "a(the) second," "a(the) third," and "a(the) fourth," may be used to describe various components, and are used merely for the purpose of distinguishing one component from other components. Therefore, the components described by the use of such terms should not be otherwise limited by the terms. For example, a first element, component, region, layer, or section, discussed below may be termed a second element, component, region, layer, or section, without departing from the scope of this disclosure.

As used herein, the expression "or" means "and/or" unless otherwise specified. As used herein, the expression "connected" may indicate a direct connection, an indirect connection, and/or indirect communication. As used herein throughout the disclosure, the term "an embodiment" or "embodiment" means a specific element described in connection with an Example is included in at least one Example described herein and may or may not exist in other Examples. For example, it should be understood that the described elements may be combined in any suitable manner in various examples.

Unless otherwise defined, technical or scientific terms used herein have the same meanings as generally understood by those skilled in the art to which the present disclosure belongs. All patents, patent applications and other references cited are incorporated herein as a reference in their entirety. However, when a terminology of the present specification is contradicted or collides with the terminology of the integrated reference, the term from the present specification takes precedence over the conflicting term in the integrated reference. Although specific examples and embodiments have been described, currently unpredicted, and/or unpredictable alternatives, modifications, variations, improvements, and substantial equivalents, may arise to the applicant or those skilled in the art. Thus, the appended claims and revision objects are intended to include all such alternatives, modifications, variations, improvements, and substantial equivalents.

$BaTiO_3$, which is a dielectric material for a multi-laminated ceramic capacitor (MLCC) of the related art, has significantly decreased permittivity under a high electric field due to a rapid decrease in dielectric spontaneous polarization. Also, $BaTiO_3$ has a Curie temperature (Tc) of 125° C., which is the transition temperature at which a ferromagnetic body changes state from a ferromagnetic state to a paramagnetic state (and/or vice versa). Therefore, the permittivity of $BaTiO_3$ is rapidly decreased at a high temperature (e.g., above 125° C.). Therefore, there is a need for a development of a novel dielectric material that stably maintains high permittivity in a high-electric field and high-temperature environment to replace $BaTiO_3$.

For example, a dielectric material according to some example embodiments may include the compound represented by Formula 1:

$$K_{1+x}NaSr_{4-2x}La_xNb_{10}O_{30}, \qquad \text{Formula 1}$$

Wherein 0<x<2.

For example, x in Formula 1 may be greater than 0 and 1 or less (e.g., $0.0 < x \le 1$). For example, x in Formula 1 may be more than 0 and 0.5 or less (e.g., $0.0 < x \le 0.5$).

The compound has improved permittivity and stable temperature permittivity properties under a high electric field at room temperature and at a high temperature (125° C.), and may retain an equivalent level of dielectric and temperature characteristics even when used under a redox atmosphere in a device. As a result, the dielectric material including the compound may be applied to a high temperature MLCC (e.g., for a vehicle and/or a special use) and may effectively function under a high electric field at room temperature and a high temperature to provide a highly efficient device as dielectric layers are made thinner.

The compound may be a tungsten-bronze crystal structure. Herein, the use of tungsten-bronze crystal structure to describe a crystal structure does not indicate that the crystal structure includes either tungsten or bronze, rather a tungsten-bronze crystal structure describes a crystal structure with a lattice structure similar to tungsten-bronze. For example, generally, a compound having a tungsten-bronze crystal structure is represented by $(A1)_2(A2)_4(C)_4(B1)_2(B2)_8O_{30}$. As B sites in a unit lattice of a tungsten-bronze crystal structure, B1 and B2 are including cations forming octahedral cavities, and may be for example, $Nb^{+5}$. As A sites around the octahedron, there are an A1-site (coordination number 12 and a tetragonal site in c-axis direction) and an A2-site (coordination number 15 and a pentagonal site in c-axis direction). A cation that occupies an A site can be selected depending on a size of the A site and may be, $K^+$, $Sr^{2+}$, $Na^+$, or $La^{3+}$. In a unit lattice, C is a triangular site in the c-axis direction, and may be empty (or vacant), or Li ions may be present as a secondary ingredient.

Tungsten-bronze crystal structures are usually stable at high temperatures, and the composition may be freely adjusted using the complexity of the structure, thereby the dielectric properties may be improved under a high electric field at room temperature and a high temperature.

The compound represented by Formula 1 may have, as a mother composition, the dielectric material $KNaSr_4Nb_{10}O_{30}$ (KNSN) which has a Curie temperature ($T_c$) higher than 200° C. The compound is a structure in which a Sr cation (e.g., $Sr^{2+}$ located in an A site in a unit lattice of a tungsten-bronze crystal structure of KNSN) is substituted with $La^{3+}$ as a donor, and $K^{+1}$ as an acceptor. The compound may be a solid solution constituted of 5 systems of $K_2O$, $Na_2O$, $SrO$, $La_2O_3$, and $Nb_2O_5$. The compound may have a tetragonal crystal structure (e.g., having a longer c-axis length in the c-axis direction). A size of a unit lattice of the compound may be increased compared to a unit lattice of the KNSN. This can be confirmed, e.g., from the results of the X-ray diffraction tests of FIGS. 3A and 3B to be described later.

The dielectric material derived from KNSN where $Sr^{2+}$ cation was substituted with $La^{3+}$ and $K^{+1}$ is structurally distorted due to the difference of the ion diameters of $Sr^{2+}$ cation and the substituents $La^{3+}$ and $K^{+1}$ and forms electrically defective clusters. As a result, polar nano regions (PNR) are formed.

The functional principle of the dielectric material according to some embodiments will be described as follows.

FIG. 1 is a conceptual diagram for explaining a case where permittivity is reduced in a thin film ferroelectric of the related art because a spontaneous polarization is fixed under a high direct current (DC) voltage (under a high electric field).

In FIG. 1, a ferroelectric 100 may be a KNSN ferroelectric of which the thickness is thinned to be hundreds of nanometers according to a high-integration and miniaturization trend. Each domain 120 of the ferroelectric 100 has a polarization 130. The ferroelectric 100 may include boundaries 110 between domains 120. When an electric field is not applied to the ferroelectric 100, the polarizations 130 of each domain 120 is directed to an arbitrary direction as shown in (a). As a high DC voltage (e.g., a DC bias 140) is applied to the ferroelectric 100, the ferroelectric is put under a high electric field. Accordingly, the polarization 130 of each domain 120 of the ferroelectric 100 is generally aligned in the same direction as the DC bias 140, and the ferroelectric 100 as a whole exhibits a polarization in the same direction as the DC bias 140. Thereafter, as shown in (c), even when the direction of the alternating current (AC) bias 150 is changed to the opposite direction of the DC bias while the DC bias 140 is still being applied to the ferroelectric 100, the direction of the polarization 130 of each domain 120 is not changed and maintains the same direction as the DC bias 140. Therefore, as described above, after the polarization 130 of the ferroelectric 100 is fixed in the direction of the DC bias 140, the polarization 130 does not react to the change of the AC bias 150, and permittivity of the ferroelectric 100 is rapidly decreased. As a result, the ferroelectric 100 cannot effectively function as a dielectric material according the high-integration and miniaturization trend.

However, the ferroelectric according to some example embodiments may be a ceramic ferroelectric that exhibits higher permittivity than KNSN, even under a high electric field wherein a high DC voltage is applied. The ceramic ferroelectric includes a portion with a low energy barrier to an AC sweep, and the ferroelectric reacts to an AC sweep even under a high electric field due to the portion with a low energy barrier to an AC sweep and exhibits higher permittivity than KNSN. For example, the dielectric properties can be maintained even under a high electric field.

The dielectric material including the compound according to some example embodiments may be referred to as a relaxer-ferroelectric.

Figure 2:
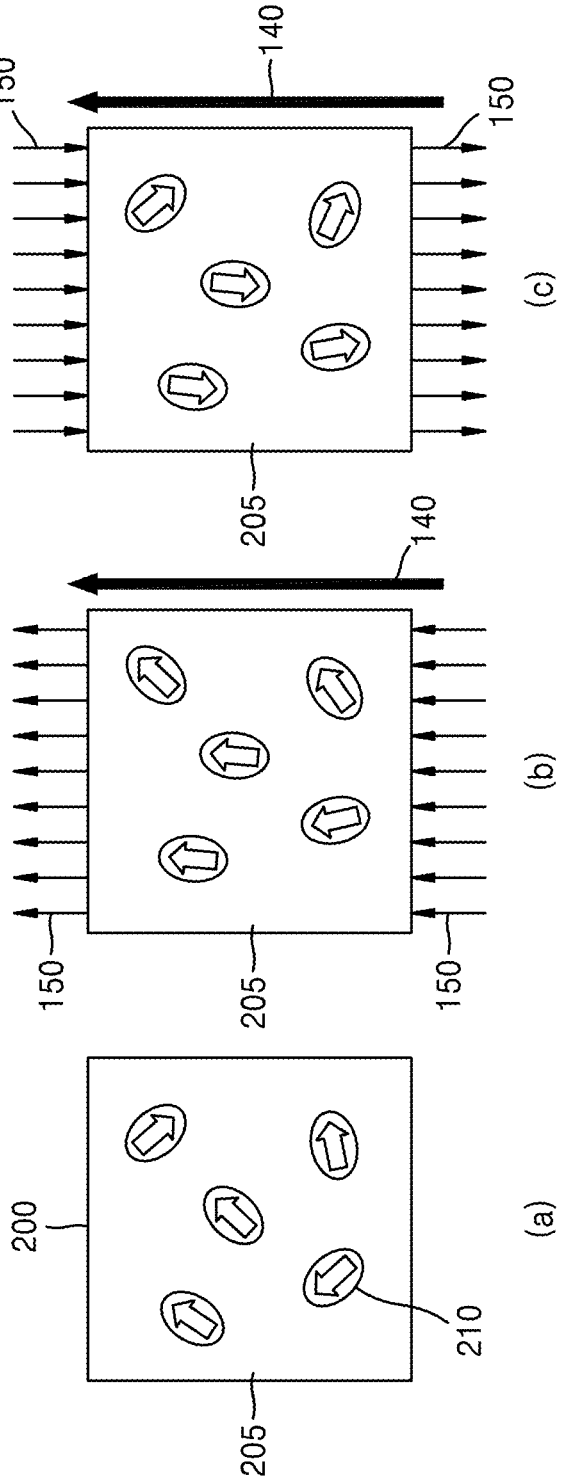
FIG. 2 is a conceptual diagram to describe a case in which, when a dielectric material according to some example embodiments is a relaxer-ferroelectric, high permittivity may be retained even under a high electric field due to a polar nano region (PNR) included in the relaxer-ferroelectric.

FIG. 2 is a conceptual diagram to describe that the dielectric material according to some example embodiments is a relaxer-ferroelectric. The relaxer-ferroelectric may retain high permittivity even under a high electric field (for example, under a high DC bias) because it reacts well to AC bias due to a polar nano region (PNR) included in the relaxer-ferroelectric.

Referring to FIG. 2, the relaxer-ferroelectric includes a ferroelectric 205 showing the first polarization characteristic, and the polar region 210 showing the second polarization characteristics in the ferroelectric 205.

The ferroelectric 205 is a dielectric material and/or a dielectric layer according to some example embodiments. The polar region 210 may be a region including a solid solution including the ferroelectric 205 and at least one other substance. When the ferroelectric 205 is a ferroelectric including the compound represented by Formula 1, the crystal structure of the relaxer-ferroelectric 200 including the polar region may be a tetragonal structure as a whole. The polar region 210 may be a region where a main element is substituted with another element in a part of the ferroelectric 205. For example, when the ferroelectric 205 is KNSN, the polar region 210 may be formed by a defect cluster where a $Sr^{2+}$ cation in an A site of KNSN is substituted with $La^{1+}$ as a donor and $K^{+1}$ s an acceptor. The polar region 210 may be a polar nano region (PNR). The first polarization characteristic and the second polarization characteristic may be different from each other. The first polarization characteristic and the second polarization characteristic may include a spontaneous polarization characteristic. The relaxer-ferroelectric 200 may be expressed as a relaxer-ferroelectric layer. The polar region 210 may be expressed as a polar layer or polar portion. The ferroelectric 205 may be expressed as a ferroelectric layer. A thickness of the ferroelectric 205 may be 1,000 nm or less.

In the relaxer-ferroelectric 200 of FIG. 2, the ferroelectric 205 includes a plurality of domains, like the ferroelectric 100 of FIG. 1, but, for convenience and clarity of illustration, the domains are not shown in FIG. 2. Each domain included in the ferroelectric 205 may include a plurality of polar regions 210. The polarization characteristics of the region except for the polar region 210 in each domain may differ from that of the polar region 210.

For example, the dielectric material including the compound, according to some example embodiments, becomes a relaxer-ferroelectric by forming PNRs. Since the polarization miniaturized to a nano size has a low energy barrier to an AC sweep even under a high electric field and DC bias, the fixation of the polarization is relieved. As a result, the dielectric material shows a relatively high effective permittivity for an AC bias change.

Without being limited to a particular theory or result, the dielectric material that formed PNR and became a relaxer-ferroelectric increases the structural diversity due to the difference in ion radius of substituents $La^{3+}$ and $K^{+1}$ as described above, and the Curie temperature ($T_c$) can be finely modified to allow permittivity to be insensitive to temperature change. As a result, permittivity of the dielectric material according to temperature becomes stable.

The compound according to some example embodiments may include, for example, $K_{1.01}NaSr_{3.98}La_{0.01}Nb_{10}O_{30}$, $K_{1.05}NaSr_{3.9}La_{0.05}Nb_{10}O_{30}$, $K_{1.1}NaSr_{3.8}La_{0.1}Nb_{10}O_{30}$, $K_{1.15}NaSr_{3.7}La_{0.15}Nb_{10}O_{30}$, $K_{1.2}NaSr_{3.6}La_{0.2}Nb_{10}O_{30}$, $K_{1.25}NaSr_{3.5}La_{0.25}Nb_{10}O_{30}$, $K_{1.3}NaSr_{3.4}La_{0.3}Nb_{10}O_{30}$, $K_{1.35}NaSr_{3.3}La_{0.35}Nb_{10}O_{30}$, $K_{1.4}NaSr_{3.2}La_{0.4}Nb_{10}O_{30}$, $K_{1.45}NaSr_{3.1}La_{0.45}Nb_{10}O_{30}$, $K_{1.5}NaSr_3La_{0.5}Nb_{10}O_{30}$, $K_{1.55}NaSr_{2.9}La_{0.55}Nb_{10}O_{30}$, $K_{1.6}NaSr_{2.8}La_{0.6}Nb_{10}O_{30}$, $K_{1.65}NaSr_{2.7}La_{0.65}Nb_{10}O_{30}$, $K_{1.7}NaSr_{2.6}La_{0.7}Nb_{10}O_{30}$, $K_{1.75}NaSr_{2.5}La_{0.75}Nb_{10}O_{30}$, $K_{1.8}NaSr_{2.4}La_{0.8}Nb_{10}O_{30}$, $K_{1.85}NaSr_{2.3}La_{0.85}Nb_{10}O_{30}$, $K_{1.9}NaSr_{2.2}La_{0.9}Nb_{10}O_{30}$, $K_{1.95}NaSr_{2.1}La_{0.95}Nb_{10}O_{30}$, $K_2NaSr_2LaNb_{10}O_{30}$, $K_{2.05}NaSr_{1.9}La_{1.05}Nb_{10}O_{30}$, $K_{2.1}NaSr_{1.8}La_{1.1}Nb_{10}O_{30}$, $K_{2.15}NaSr_{1.7}La_{1.15}Nb_{10}O_{30}$, $K_{2.2}NaSr_{1.6}La_{1.2}Nb_{10}O_{30}$, and/or $K_{2.25}NaSr_{1.5}La_{1.25}Nb_{10}O_{30}$.

An electric field-polarization graph of the dielectric material may have a linear curve shape. For example, as an amount of La is increased, residual polarization (Pr) is reduced, and the polarization is proportional to electric field. This will be discussed in further detail with regard to FIGS.

6B to 6E described later. A device including such a dielectric material may have an improved dielectric properties under a high electric field.

A maximum permittivity of the dielectric material may be 1,000 to 2,600 at 1 kHz. For example, maximum permittivity of the dielectric material at 1 kHz may be, 1000 to 1200, 1200 to 1400, 1400 to 1600, 1600 to 1800, 1800 to 2000, and/or, for example, 2000 to 2600. As the dielectric properties are improved when a device includes such a dielectric material, and as the dielectric materials are more easily made into thinner films, more miniaturized devices with a higher capacity can be developed and/or easily manufactured.

The graph showing changes in permittivity according to temperature of the dielectric material may have a shape in which, as an amount of La is increased, a temperature at which the dielectric material has a maximum permittivity ($T_{max}$) is decreased. This can be confirmed by FIGS. 5 and 7B to 7E described later. The device including such a dielectric material may have a stable temperature characteristics of permittivity under a high electric field.

A device according to some example embodiments includes a plurality of electrodes; and a dielectric layer arranged between the plurality of electrodes. The dielectric layer includes the dielectric material according to, e.g., the example embodiments described above.

The device is not particularly limited as long as it is used in an electrical circuit, an electronic circuit, an electromagnetic circuit, and/or the like, and provides an electrical output for an electrical input. The electrical input may be a current or voltage, and the current may be a direct or an alternating current. Electrical inputs may be continuous or intermittent according to a certain cycle. The device may store electrical energy, electrical signals, magnetic energy and/or magnetic signals. The device may be (and/or include) a passive and/or an active element, e.g., a semiconductor, memory, processor, and/or the like. The device may be, for example, a resistor, an inductor, a capacitor, and/or the like.

The device may be, for example, a capacitor.

For example, the device may be a multi-layered capacitor including a plurality of internal electrodes and dielectric layers alternately arranged between the plurality of internal electrodes.

The device includes, as a dielectric layer, a dielectric material that has improved permittivity and stable temperature properties of permittivity under a high electric field at room temperature and a high temperature, and retains an equivalent level of dielectric and temperature characteristics even when used under a redox atmosphere in the device. As a result, it may not require a protective layer to prevent volatilization of an alkali metal (such as sodium) in the upper and/or lower portion of the dielectric layer in the device.

The resistivity of the dielectric layer may be 1.0 E+11 Ωcm to 1.0 E+14 Ωcm. The dielectric layer may have excellent insulating properties under a high electric field at room temperature and a high temperature, for example, at 125° C. when 8.7 V/μm of DC bias and 87 mV/μm of AC is applied.

An effective permittivity of the dielectric layer at room temperature and 125° C. when 8.7 V/μm of DC bias is applied may be 1,000 to 1,150. For example, an effective permittivity of the dielectric layer at room temperature and 125° C. when 8.7 V/μm of DC bias is applied may be, 1,020 to 1,040, 1,040 to 1,050, 1,040 to 1,100, 1,050 to 1,100, or 1,050 to 1,150, and/or for example, 1,000 to 1,150. The dielectric properties of the device including such a dielectric layer are improved, and as the dielectric layers are more easily made into thinner films, more miniaturized devices with a higher capacity may be developed.

Figure 4:
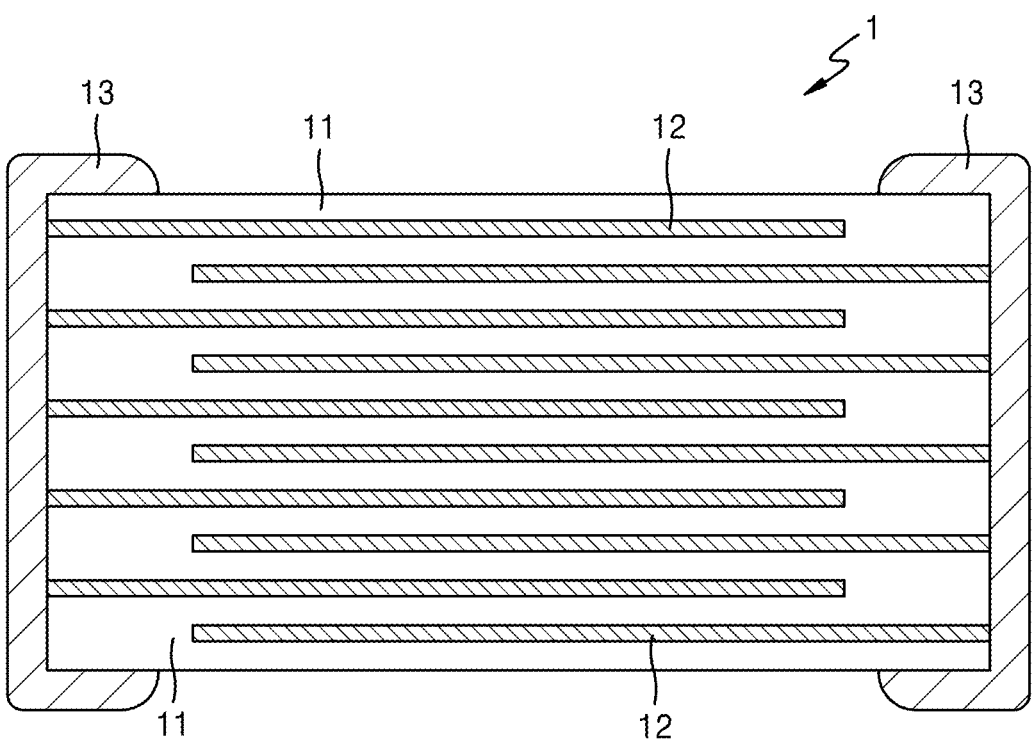
FIG. 4 is a schematic diagram of a multi-layered ceramic capacitor (MLCC) according to some example embodiments.

FIG. 4 is a schematic diagram of a multi-layered ceramic capacitor (MLCC) according to some example embodiments.

Referring to FIG. 4, a multi-layered capacitor 1, according to some example embodiments, includes a plurality of internal electrodes 12 and dielectric layers 11 alternately arranged between the plurality of internal electrodes 12. The plurality of internal electrodes 12 and the dielectric layers 11 have an alternately laminated structure, and the dielectric layer 11 includes a dielectric material according to, e.g., the example embodiments described above. The adjacent internal electrodes 12 are electrically separated from each other by the dielectric layers 11 arranged between them. As the internal electrodes 12 and the dielectric layers 11 are alternately laminated in the multi-layered capacitor 1, adjacent internal electrodes 12 and a dielectric layer 11 arranged between them work as a unit capacitor. In the multi-layered capacitor 1, the number of internal electrodes 12 and dielectric layers 11 alternately laminated, is each independently, for example, 2 or more, 5 or more, 10 or more, 20 or more, 50 or more, 200 or more, 500 or more, 1,000 or more, 2,000 or more, 5,000 or more, and/or 10,000 or more. The multi-layered capacitor 1 provides a capacitance resulting from the structure in which a plurality of unit capacitors is laminated. As the number of internal electrodes 12 and the dielectric layer 11 increases, their contact area increases, and the capacitance is improved. The internal electrode 12 is arranged, for example, to have a surface area smaller than a surface area of the dielectric layer 11.

The plurality of internal electrodes 12, for example, has the same surface area, and adjacent internal electrodes 12 are not placed at the same position (e.g., one on top of another of internal electrodes 12), but is laminated alternately on both sides of the multi-layered capacitor 1 in a partially protruding form.

The internal electrode 12 may be formed using a conductive paste including, for example, one or more selected from, nickel (Ni), copper (Cu), palladium (Pd), a palladium-silver (Pd—Ag) alloy, a combination thereof, and/or the like. For example, the main component of the internal electrode 12 may be Ni. For example, the internal electrode 12 may be Ni and/or a Ni alloy in terms of cost reduction. The forming of the internal electrodes 12 may include a printing method. The printing method of the conductive paste may be a screen printing method and/or a gravure printing method, but the example embodiments are not particularly limited thereto, and all methods that are used to form an internal electrode in the art may be used. A thickness of the internal electrode 12 is, for example, 100 nm to 5 μm, 100 nm to 2.5 μm, 100 nm to 1 μm, 100 nm to 800 nm, 100 nm to 400 nm, or 100 nm to 200 nm. A distance between the internal electrodes 12 may coincide with the thickness of the dielectric layer 11. For example, in some example embodiments, a distance between internal electrodes may be 1,000 nm or less.

The plurality of internal electrodes 12, arranged on both sides of the multi-layered capacitor 1, alternately and partially protruding shape may be electrically connected to an external electrode 13. The external electrode 13 is arranged on, for example, the laminate including the plurality of internal electrodes 12; and the dielectric layers 11 alternately arranged between the internal electrodes 12. The multi-layered capacitor 1 includes internal electrodes 12 and the external electrodes 13 connected to the internal electrodes 12. The multi-layered capacitor 1 includes, for example, a pair of external electrodes 13, which respectively surrounds a side of the laminated structure including the dielectric layers 11 and the internal electrodes 12. The external electrode 13 may include any material that has electrical conductivity, such as a metal can be used, and the specific material can be determined considering electrical properties, structural stability, and/or the like. The external electrode 13 may have, for example, a multi-layered structure. The external electrode 13 may include, for example, a laminate, an electrode layer including Ni in contact with the internal electrode 12, and a plating layer formed on the electrode layer.

The dielectric layer 11 of the multi-layered capacitor 1 is arranged to have a wider area than the adjacent internal electrode 12. The dielectric layers 11 arranged between adjacent internal electrodes 12 in the multi-layered capacitor 1 is, for example, connected to each other. The dielectric layers 11 arranged between adjacent internal electrodes 12 are connected to each other on sides of the multi-layered capacitor 1 in contact with the external electrode 13. In some example embodiments, the external electrode 13 may be omitted. When the external electrode 13 is omitted, the internal electrodes 12 may be protruded out of the side of the multi-layered capacitor 1 and connected to the power source.

A thickness of the dielectric layer 11 in the unit capacitor including the adjacent internal electrodes 12 and a dielectric layer 11 arranged therebetween. For example, the interval between adjacent internal electrodes 12 is, for example, 1,000 nm or less, 10 nm to 1 μm, 100 nm to 800 nm, 100 nm to 600 nm, and/or 100 nm to 300 nm. Permittivity of the dielectric layer 11 in a unit capacitor including adjacent internal electrodes 12 and a dielectric layer 11 arranged between them is, for example, 610 or more at room temperature (25° C.) with the frequency in the range of 1 kHz to 1 MHz.

As a multi-layered capacitor 1 includes a dielectric layer 11 having such thin thickness and high permittivity, the capacitance of the multi-layered capacitor 1 is improved, and the thickness and volume of the multi-layered capacitor 1 are reduced. Therefore, it is possible to provide a thinned and miniaturized capacitor with a high capacity.

Figure 8A:
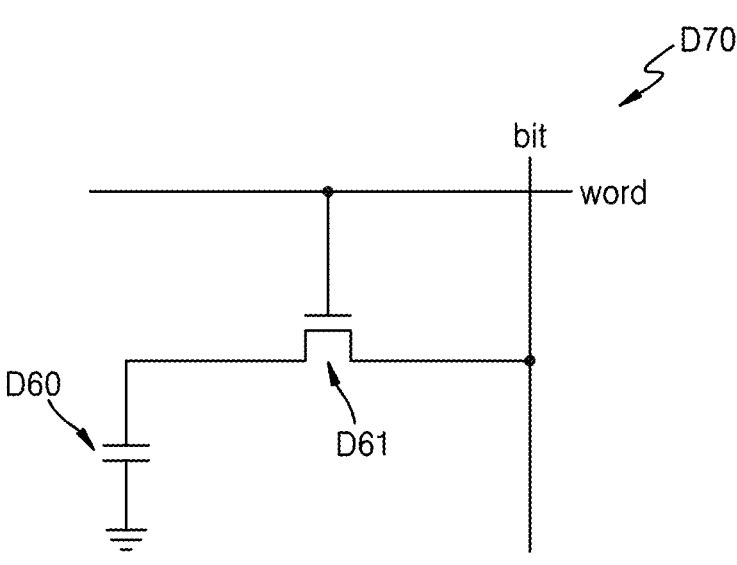
FIG. 8A illustrates a circuit configuration of a memory cell of a memory device including a semiconductor device and a capacitor.
Figure 8B:
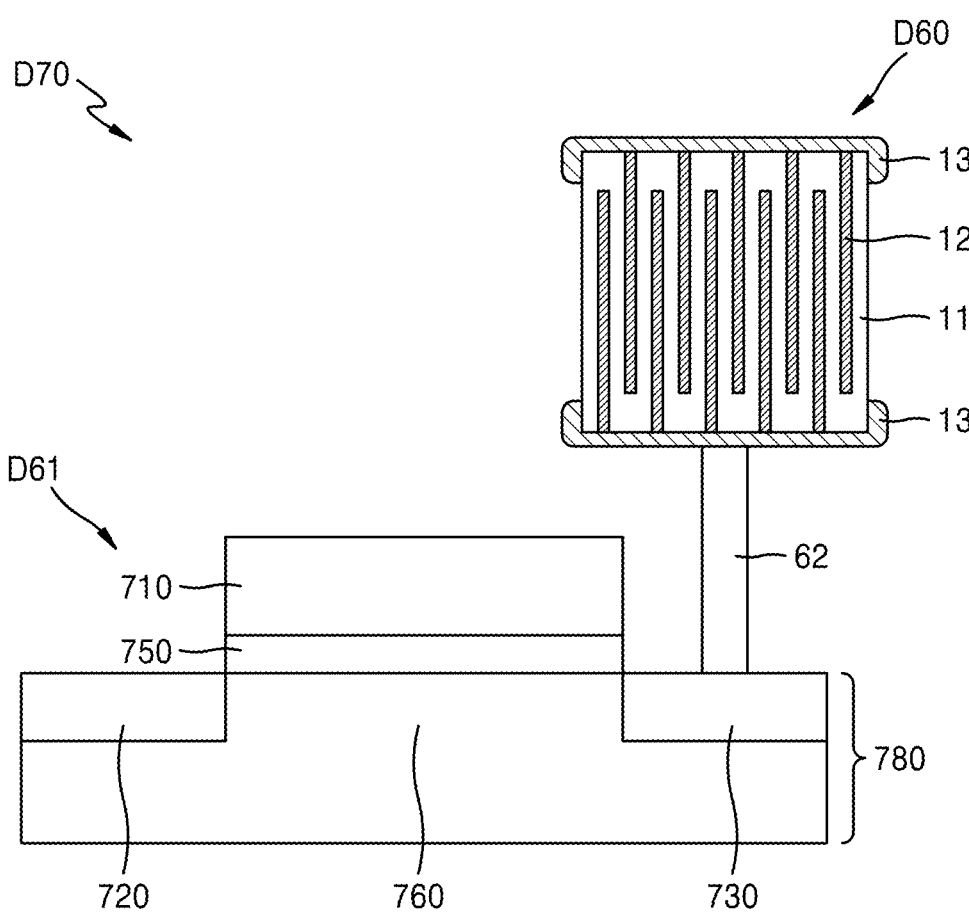
FIG. 8B is a schematic diagram showing a semiconductor apparatus according to some example embodiments.

FIG. 8A illustrates a circuit configuration of a memory cell of a memory device including a semiconductor device and a capacitor. FIG. 8B is a schematic diagram showing a semiconductor apparatus according to some example embodiments.

Referring to FIGS. 8A and 8B, the semiconductor apparatus D70 may be included in a memory device as a memory cell and may include a transistor D61 and a capacitor D60 electrically connected to, for example, a source region 730 of the transistor D61. The memory device may include a plurality of bit lines and a plurality of word lines, and may further include a plurality of the memory cells. Each word line may be electrically connected to a gate electrode 710 of the transistor D61, and each bit line may be electrically connected to a drain region 720 of the transistor D61. An electrode of the capacitor D60 may be connected to, for example, a voltage controller (not shown).

The semiconductor apparatus D70 may be included in a plurality of semiconductor apparatuses, for example in a memory cell array.

The capacitor D60 may be, for example the multi-layer capacitor 1 of FIG. 4 and/or a capacitor including, in the dielectric, a compound represented by Formula 1. One of the outer electrodes 13 of the capacitor D60 and one of the source region 730 and the drain region 720 of the transistor D61 may be electrically connected by a contact 62. The contact 62 may include a conductive material, such as tungsten, copper, aluminum, polysilicon, and the like.

The field effect transistor D61 may include a substrate 780 including a source region 730, a drain region 720, and a channel 760, and a gate electrode 710 facing the channel 760. A dielectric layer 750 may be between the substrate 780 and the gate electrode 710. The field effect transistor D61 of FIG. 7B shows an example that does not include the compound represented by Formula 1 in the dielectric layer 750, but the field effect transistor may also include the compound.

The semiconductor apparatus D70, the capacitor D60, and/or the field effect transistor D61 may be included, in an electronic device architecture.

Figure 9:
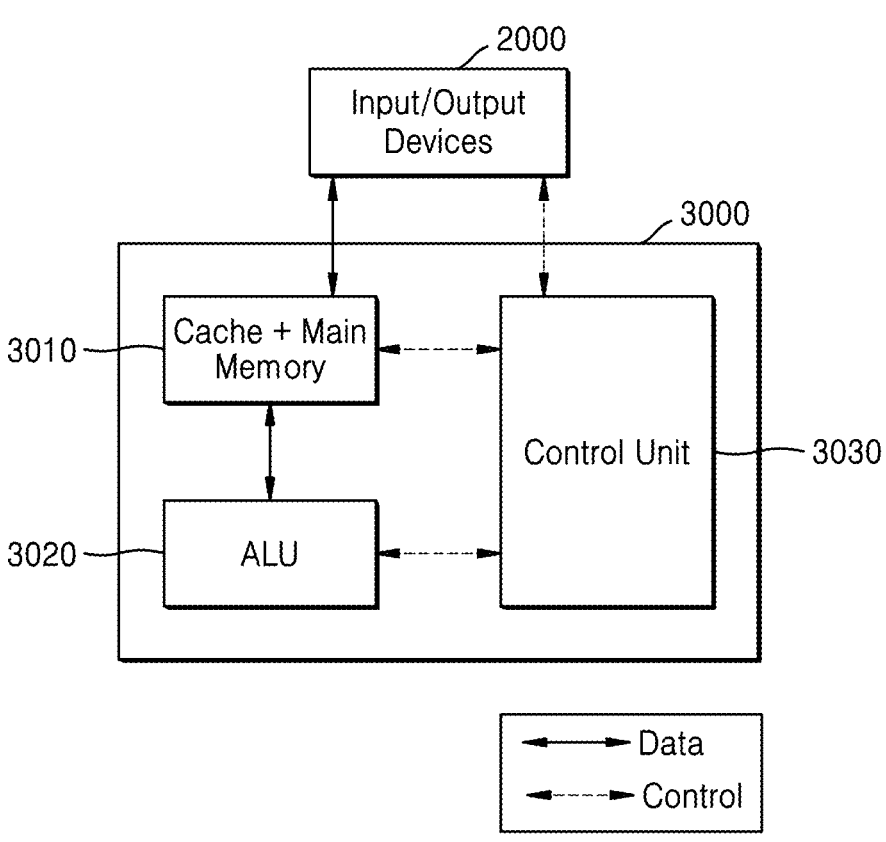
FIGS. 9 and 10 are conceptual views schematically illustrating electronic device architectures applicable to electronic devices according to some example embodiments.
Figure 10:
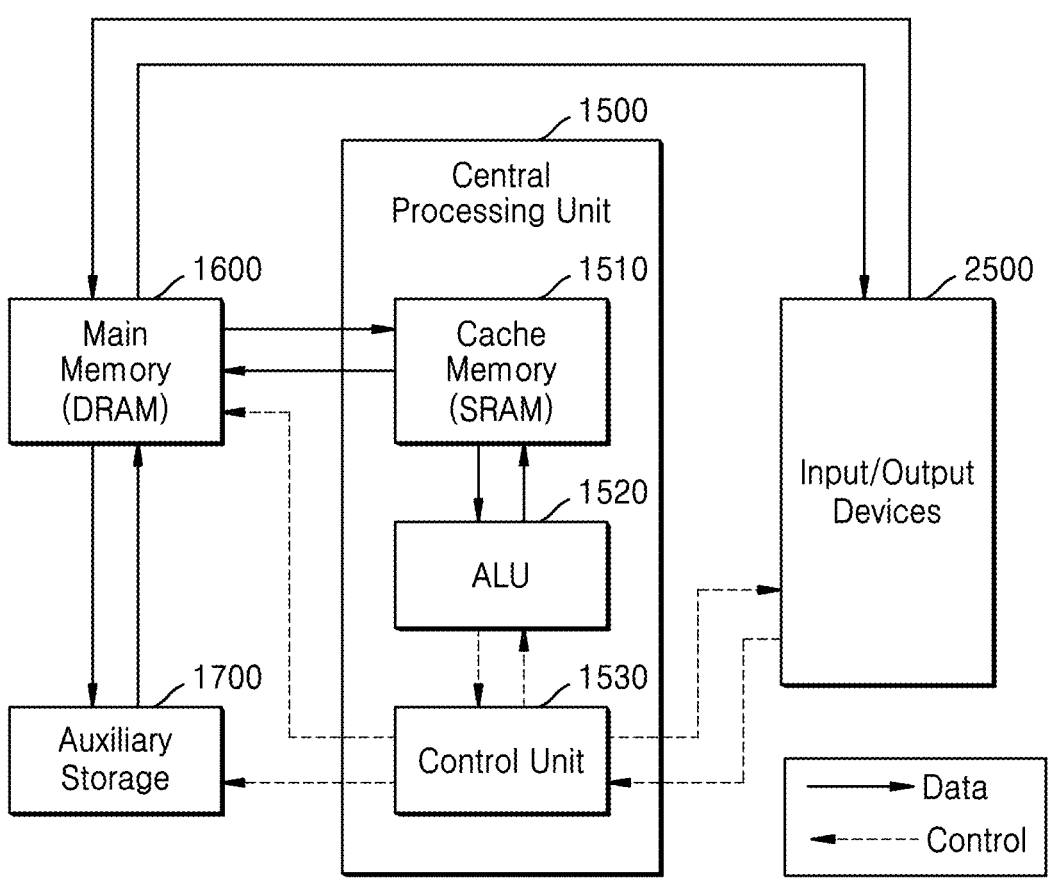

FIGS. 9 and 10 are conceptual views schematically illustrating electronic device architectures applicable to electronic devices according to some example embodiments.

Referring to FIG. 9, an electronic device architecture 3000 may include a memory unit 3010, an arithmetic logic unit (ALU) 3020, and a control unit 3030. The memory unit 3010, the ALU 3020, and the control unit 3030 may be electrically connected to each other. For example, the electronic device architecture 3000 may be implemented as a single chip including the memory unit 3010, the ALU 3020, and/or the control unit 3030. For example, the memory unit 3010, the ALU 3020, and the control unit 3030 may be connected to each other through metal lines on a chip for direct communication therebetween. The memory unit 3010, the ALU 3020, and/or the control unit 3030 may be monolithically integrated on a single substrate to form a single chip. Input/output devices 2000 may be connected to the electronic device architecture (chip) 3000. The control unit 3030 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc. Similarly, though the electronic device architecture 3000 is illustrated as including the ALU 3020, the electronic device architecture 3000 is not limited, and may contain additional and/or alternative processing circuitry. The memory unit 3010 may include a main memory and a cache memory. The electronic device architecture (chip) 3000 may be an on-chip memory processing unit.

The memory unit 3010, the ALU 3020, and/or the control unit 3030 may each independently include the above-described compound. Referring to FIG. 10, a cache memory 1510, an ALU 1520, and a control unit 1530 may form a central processing unit (CPU) 1500, and the cache memory 1510 may include a static random access memory (SRAM). A main memory 1600 and an auxiliary storage 1700 may be provided apart from the CPU 1500. The main memory 1600 may include a dynamic random access memory (DRAM) including layer structures such as those described above.

In some cases, an electronic device architecture may be implemented in a form in which unit computing devices and unit memory devices are adjacent to each other on a single chip without sub-units.

The method of manufacturing a dielectric material according to some embodiment may include mechanically milling a mixture of potassium salts, sodium salts, strontium salts, niobium compounds, and lanthanum compounds; and performing a first heat-treatment in an oxidizing atmosphere, wherein, the dielectric material may include the compound represented by the following Formula 1:

$$K_{1+x}NaSr_{4-2x}La_xNb_{10}O_{30}, \quad \text{Formula 1}$$

wherein $0<x<2$.

A mixture of potassium salts, sodium salts, strontium salts, niobium compounds, and lanthanum compounds is prepared. The preparation of the mixture may include, for example, at least one of measuring the salts and compounds to produce a mixture based on the stoichiometric ratio of Formula 1. The potassium salts, sodium salts, strontium salts may be, for example, a carbonate, a sulfate, or a combination thereof. The niobium compound and the lanthanum compound may be, for example, oxides of niobium and lanthanum.

Amounts of potassium salts, sodium salts, strontium salts, niobium compounds, and lanthanum compounds in the mixture are stoichiometrically controlled to obtain a compound represented by Formula 1.

Next, a mechanical milling is performed on the mixture. The mechanical milling method may be a ball-milling, air jet-milling, bead milling, roll-milling, hand milling, high energy ball milling, planetary ball milling, stirred ball mill, vibrating milling, mechanofusion milling, shaker milling, attritor milling, disk milling, shape milling, nauta milling, nobilta milling, high speed mix, a combination thereof, and/or the like. The mechanical milling process may be and/or include, for example, a dry milling process and/or a wet milling process (utilizing a solvent). When the mixture is mechanically milled according to a wet milling method, a dielectric material with improved permittivity can be prepared.

When performing a wet milling process a volatile organic solvent and/or alcohol (e.g., ethanol and/or the like) may be used as the solvent. The time for mechanical milling is variable depending on the milling conditions, and is for example, 1 hour to 30 hours, for example, 5 hours to 25 hours.

On the mechanically milled mixture a first heat-treatment is performed in an oxidizing atmosphere. The first heat-treatment may be referred to as a first oxidation operation. During the first-heat treatment, the solvent may be evaporated and/or consumed during the oxidation. The first heat-treatment may be performed at a temperature of 900° C. to 1200° C. The first heat-treatment may be performed at, for example, 900° C. to 1150° C. The first heat-treatment may be performed for 1 hour to 30 hours, or for 2 hours to 15 hours. When the dielectric material is heat treated in an oxidizing atmosphere and in this time range, the dielectric properties of the dielectric material can be further enhanced.

After the first heat-treatment in an oxidizing atmosphere, the manufacturing process further includes: molding the product on which the first heat-treatment had been performed; and performing a second heat-treatment on the molded article.

The second heat-treatment may be performed at a temperature of 1200° C. to 1500° C. The second heat-treatment may be performed at, for example, 1250° C. to 1400° C. The second heat-treatment may be performed for 1 hour to 30 hours, or for 3 hours to 25 hours. The second heat-treatment may be (and/or include), for example, a sintering operation. As the manufacturing process further includes the second heat treatment under such conditions, a defect occurrence in a dielectric material may be more effectively prevented.

The first heat-treatment and second heat-treatment in an oxidizing atmosphere may be performed in an atmosphere including oxygen, carbon dioxide, air, and/or the like. In an atmosphere including oxygen, carbon dioxide, air, a combination thereof, and/or the like. An amount of oxygen, carbon dioxide, air, and/or the like may be, for example, 0.1 volume % to 10 volume %, 0.1 volume % to 5 volume %, 0.1 volume % to 3 volume %, or 0.5 volume % to 2 volume % of a total volume of the gas. The remaining gas (e.g., except for oxygen, carbon dioxide, air, and/or the like) may be an inert gas. The inert gas may be, for example argon, nitrogen, and/or the like, but are not limited thereto, and all gases used as an inert gas in the art may be used. In some example embodiments, the oxidizing atmosphere may be, for example, an air atmosphere.

The dielectric material prepared by the manufacturing method has high permittivity and resistivity and is stable even at a high temperature.

Hereinafter, some examples and comparative examples of the present disclosure are described. However, the following examples are for an illustrative purpose only and the scope of the present disclosure is not limited thereto.

EXAMPLES (Manufacture of Dielectric Material)

Example 1: Dielectric Material $K_{1.25}NaSr_{3.5}La_{0.25}Nb_{10}O_{30}$ $K_2CO_3$, $Na_2CO_3$, $SrCO_3$, $Nb_2O_5$, and $La_2O_3$ were mixed in a reactor. Ethanol and zirconia balls were added, and a mixture was prepared by ball milling on the mixture for 24 hours in an air atmosphere at room temperature. The prepared mixture was dried at 100° C. for 1 day to obtain dry powder. Amounts of $K_2CO_3$, $Na_2CO_3$, $SrCO_3$, $Nb_2O_5$, and $La_2O_3$ were stoichiometrically controlled to obtain a compound $K_{1.25}NaSr_{3.5}La_{0.25}Nb_{10}O_{30}$.

The dry powder was put into an alumina crucible and a first heat-treatment was performed in an air atmosphere at 1100° C. for 4 hours.

The product obtained by the first heat-treatment was pressed with a uniaxial pressure to prepare a pellet. The prepared pellet was pressurized for 3 minutes with a 250 MPa of cold isotactic pressure to obtain a molded article.

On the molded article, a second heat-treatment was performed in an air atmosphere at 1360° C. for 4 hours to prepare the dielectric material $K_{1.25}NaSr_{3.5}La_{0.25}Nb_{10}O_{30}$.

Example 2: Dielectric Material $K_{1.5}NaSr_3La_{0.25}Nb_{10}O_{30}$

The dielectric material $K_{1.5}NaSr_3La_{0.5}Nb_{10}O_{30}$ was prepared in the same manner as in Example 1, except that amounts of $K_2CO_3$, $Na_2CO_3$, $SrCO_3$, $Nb_2O_5$, and $La_2O_3$ were stoichiometrically controlled to obtain $K_{1.5}NaSr_3La_{0.5}Nb_{10}O_{30}$.

Example 3: Dielectric Material $K_{1.75}NaSr_{2.5}La_{0.75}Nb_{10}O_{30}$

The dielectric material $K_{1.75}NaSr_2\text{-}5La_{0.75}Nb_{10}O_{30}$ was prepared in the same manner as in Example 1, except that amounts of $K_2CO_3$, $Na_2CO_3$, $SrCO_3$, $Nb_2O_5$, and $La_2O_3$ were stoichiometrically controlled to obtain $K_{1.75}NaSr_2\text{-}5La_{0.75}Nb_{10}O_{30}$.

Example 4: Dielectric Material $K_2NaSr_2LaNb_{10}O_{30}$

The dielectric material $K_2NaSr_2LaNb_{10}O_{30}$ was prepared in the same manner as in Example 1, except that amounts of $K_2CO_3$, $Na_2CO_3$, $SrCO_3$, $Nb_2O_5$, and $La_2O_3$ were stoichiometrically controlled to obtain $K_2NaSr_2LaNb_{10}O_{30}$.

Comparative Example 1: Dielectric Material $KnaSr_4Nb_{10}O_{30}$

The dielectric material $KnaSr_4Nb_{10}O_{30}$ (KNSN) was prepared in the same manner as in Example 1, except that amounts of $K_2CO_3$, $Na_2CO_3$, $SrCO_3$, and $Nb_2O_5$, were stoichiometrically controlled to obtain $KnaSr_4Nb_{10}O_{30}$.

Comparative Example 2: Dielectric Material $K_2NaSr_2NdNb_{10}O_{30}$

The dielectric material $K_2NaSr_2NdNb_{10}O_{30}$ was prepared in the same manner as in Example 1, except that amounts of $K_2CO_3$, $Na_2CO_3$, $SrCO_3$, $Nb_2O_5$, and $Nd_2O_3$ were stoichiometrically controlled to obtain $K_2NaSr_2NdNb_{10}O_{30}$.

Comparative Example 3: Dielectric Material $K_2NaSr_2SmNb_{10}O_{30}$

The dielectric material $K_2NaSr_2SmNb_{10}O_{30}$ was prepared in the same manner as in Example 1, except that amounts of $K_2CO_3$, $Na_2CO_3$, $SrCO_3$, $Nb_2O_5$, and $Sm_2O_3$ were stoichiometrically controlled to obtain $K_2NaSr_2SmNb_{10}O_{30}$.

Evaluation Example 1: X-ray Diffraction Experiment

Figure 3A:
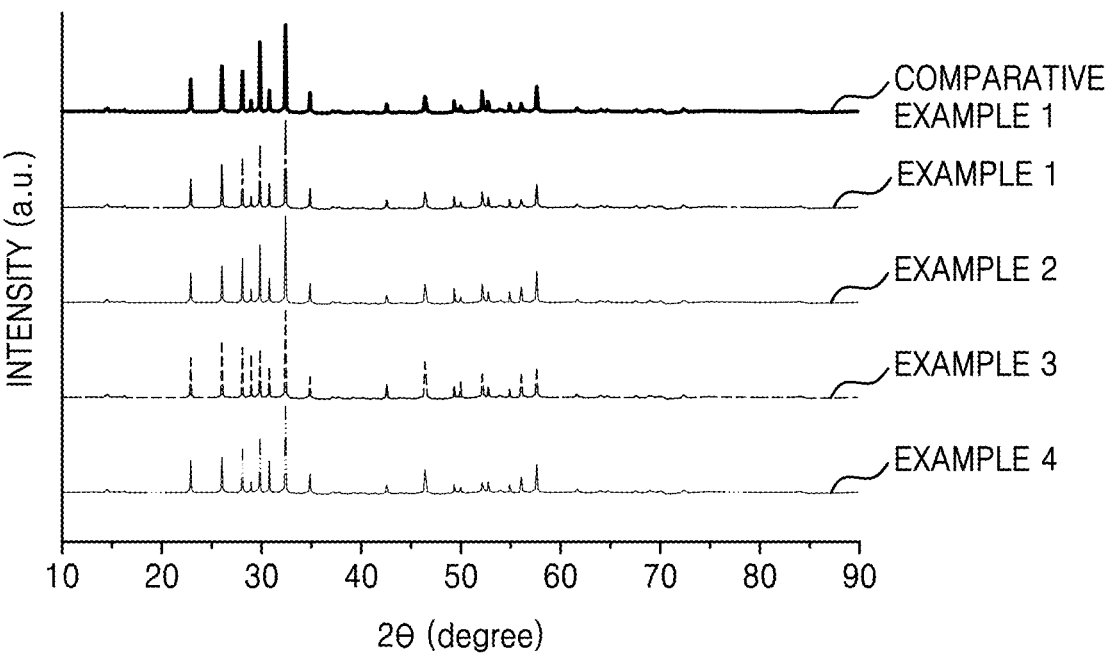
FIG. 3A shows results of an X-ray diffraction test conducted on dielectric materials of Comparative Example 1 and Examples 1 to 4.
Figure 3B:
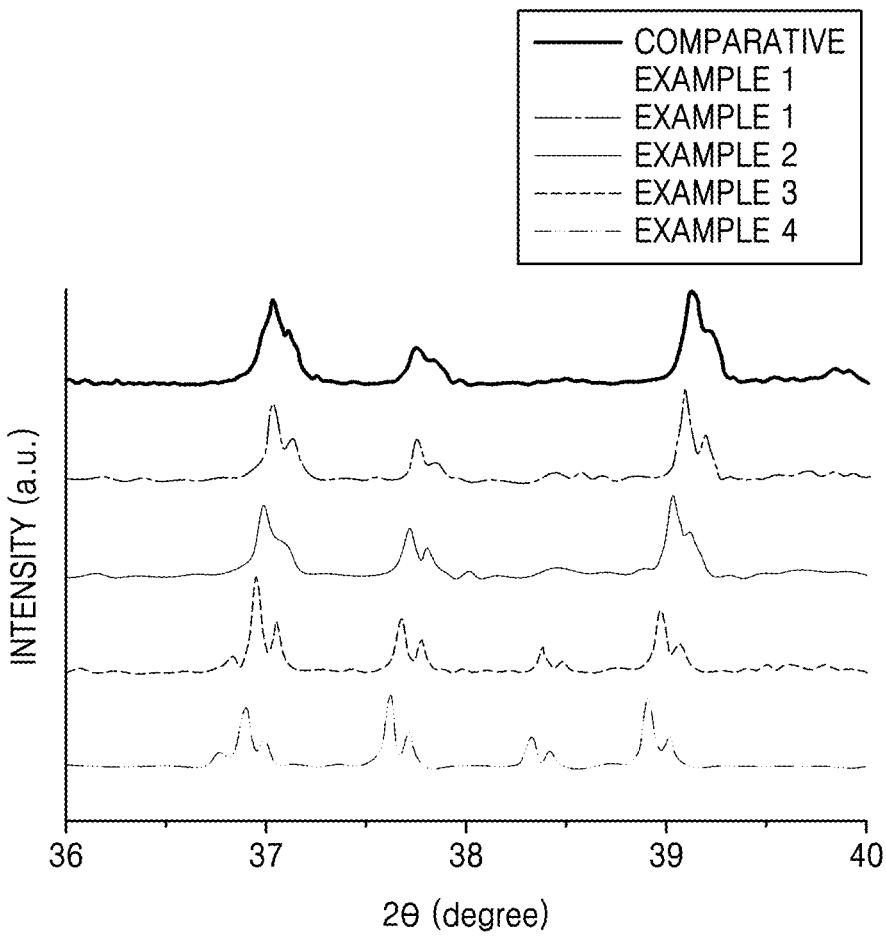
FIG. 3B is an enlarged image of a region where a diffraction angle $2\theta$ is $36°$ to $40°$, taken from the results of the X-ray diffraction test in FIG. 3A.

An X-ray diffraction (XRD) spectrum was obtained using a Cu Ka radiation for the dielectric materials of Comparative Example 1 and Examples 1 to 4, and the results are shown in FIGS. 3A and 3B.

Referring to FIG. 3A, it can be confirmed that the crystal structure of the mother dielectric material $KnaSr_4Nb_{10}O_{30}$ of Comparative Example 1 is tetragonal $KnaSr_4Nb_{10}O_{30}$ (space group: P4bm). An XRD spectrum of the dielectric materials of Examples 1 to 4 showed a similar pattern as the dielectric material of Comparative Example 1, and it can be confirmed that they had the same crystal structure as the dielectric material of Comparative Example 1.

Referring to FIG. 3B, the diffraction peak was shifted in the direction of a smaller diffraction angle in the region where the diffraction angle 26 of the dielectric materials of Examples 1 to 4 is 39°±1° compared to the diffraction peak of the dielectric material of Comparative Example 1 in the region of diffraction angle 28. From this, it can be seen that a size of a unit lattice of the dielectric materials of Examples 1 to 4 was increased compared to a unit lattice of the mother dielectric material $KnaSr_4Nb_{10}O_{30}$.

Evaluation Example 2: Temperature Characteristics Evaluation

Silver (Ag) was applied as electrodes on both sides of the dielectric pellet prepared in Comparative Example 1 and Examples 1 to 4 to prepare a specimen. Permittivity of the specimen wherein electrodes were formed on both sides was measured using an inductance, capacitance, resistance (LCR) meter (Agilent, E4980A) at 25° C. and under the condition of 1 kHz/1.0 V. According to Electronic Industries Association(EIA) specification X7S, permittivity is measured in a temperature control chamber from –55° C. to 125° C. at intervals of 5° C., and a part of the results is shown in FIG. 5 and Table 1.

Figure 5:
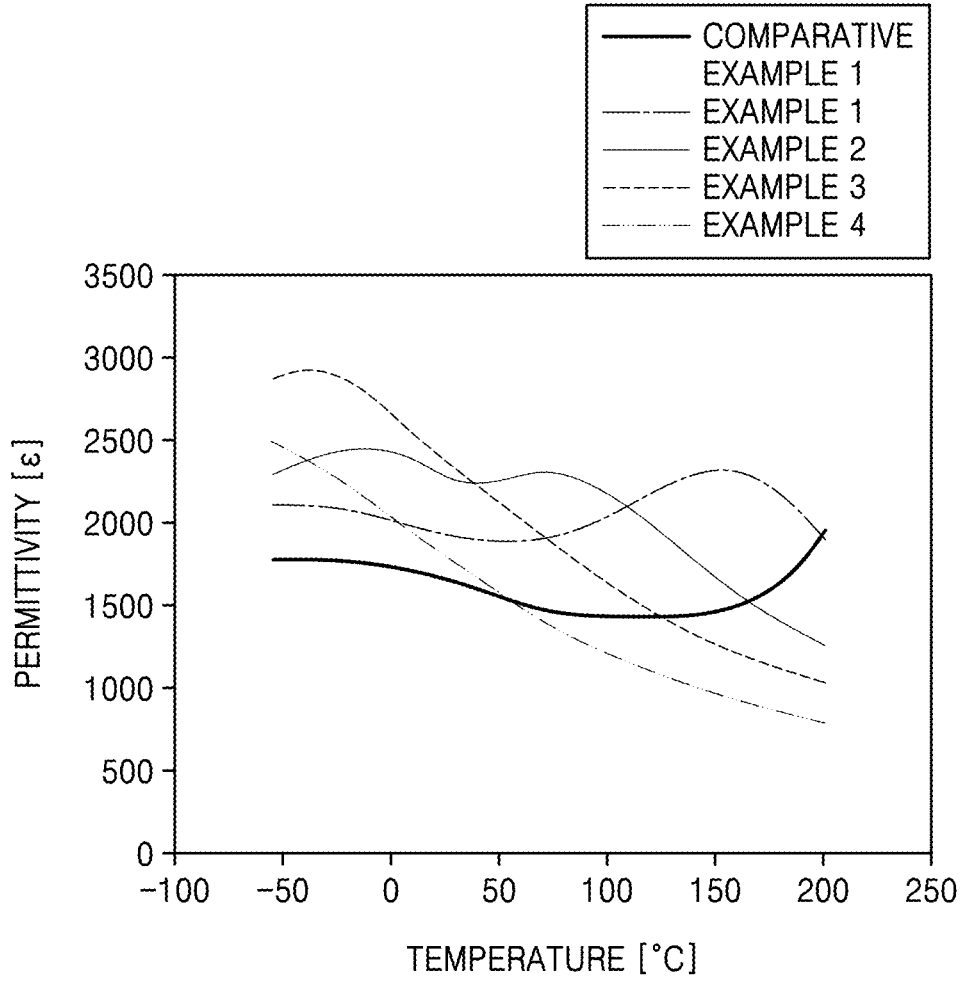
FIG. 5 is a graph showing changes in permittivity according to temperature of dielectric materials of Comparative Example 1 and Examples 1 to 4.
Figure 6A:
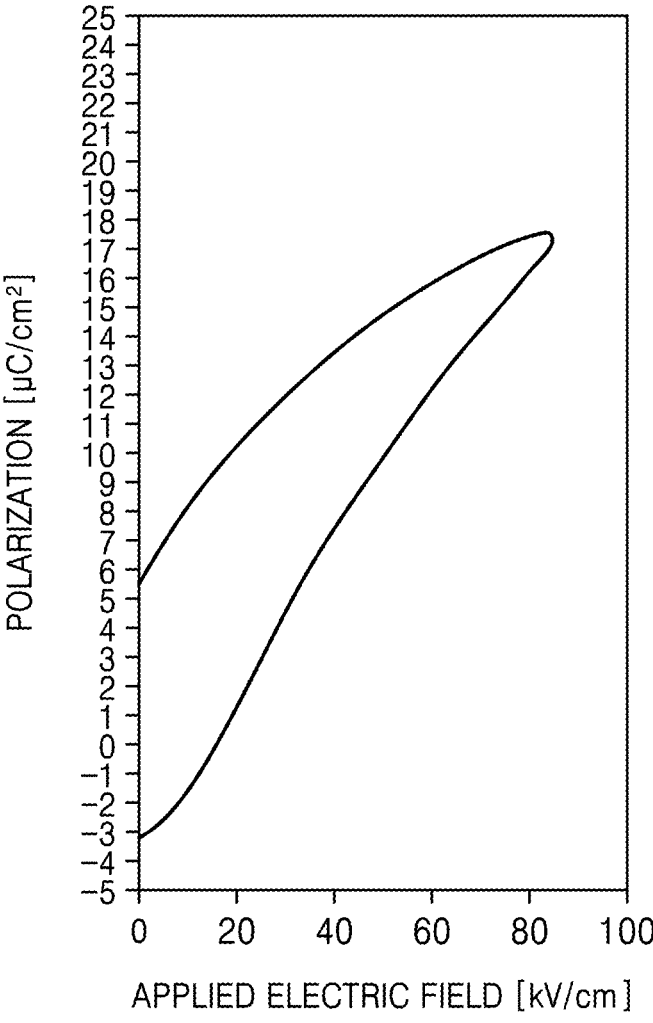
FIG. 6A to 6E are a hysteresis loop measuring the polarization behavior according to the change in an electric field at $25°$ C. for dielectric materials of Comparative Example 1 and Examples 1 to 4, respectively.
Figure 6B:
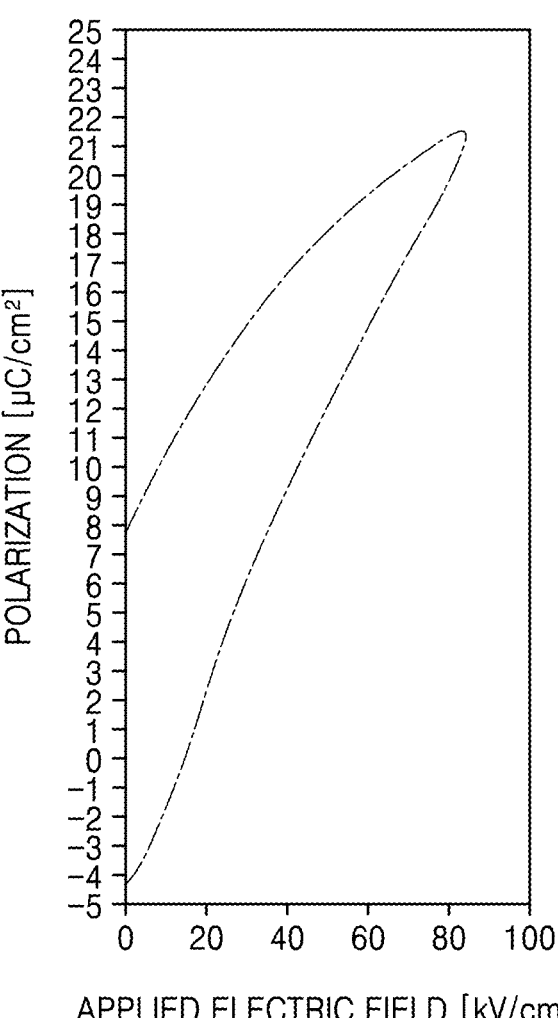
Figure 6C:
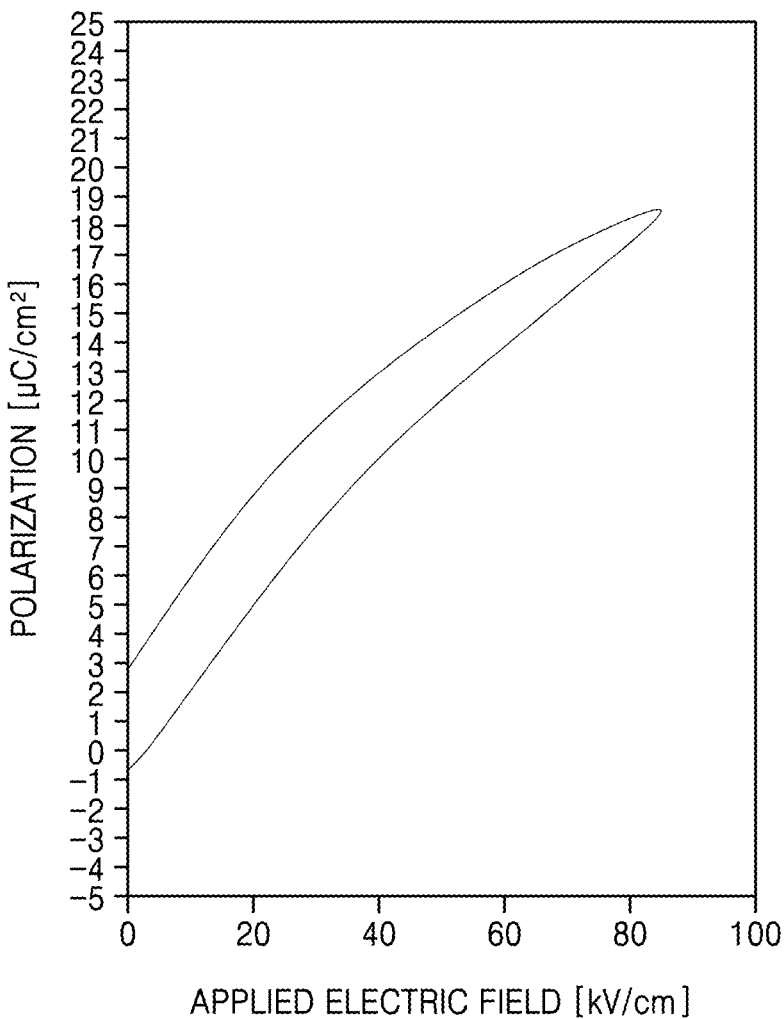
Figure 6D:
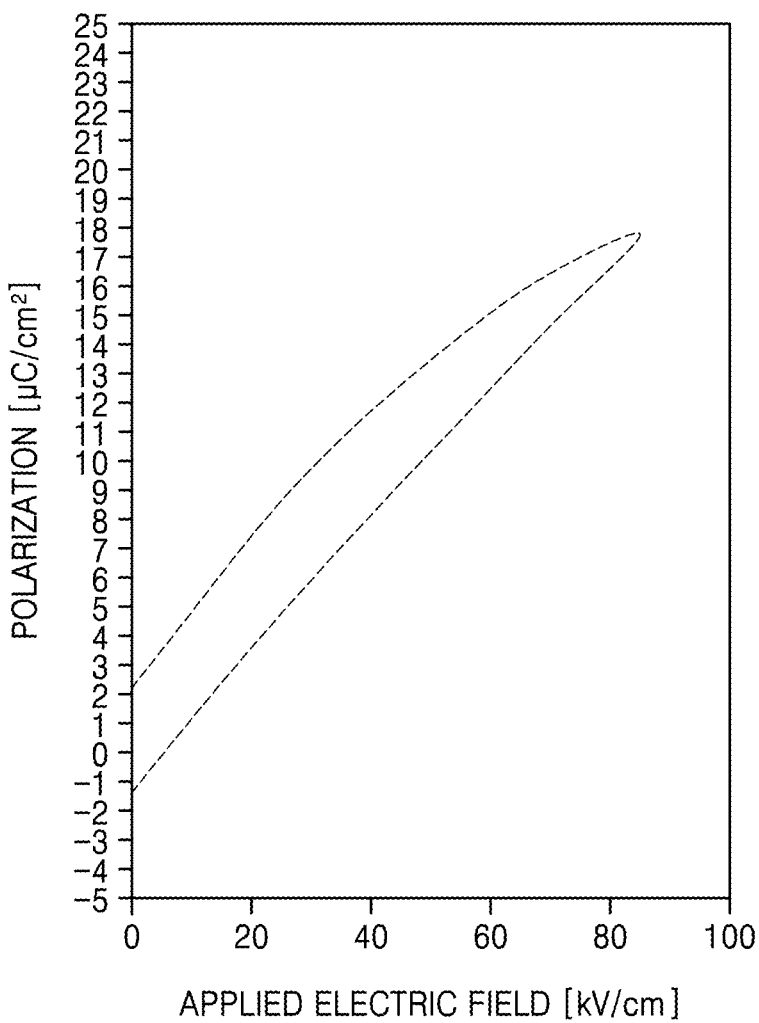
Figure 6E:
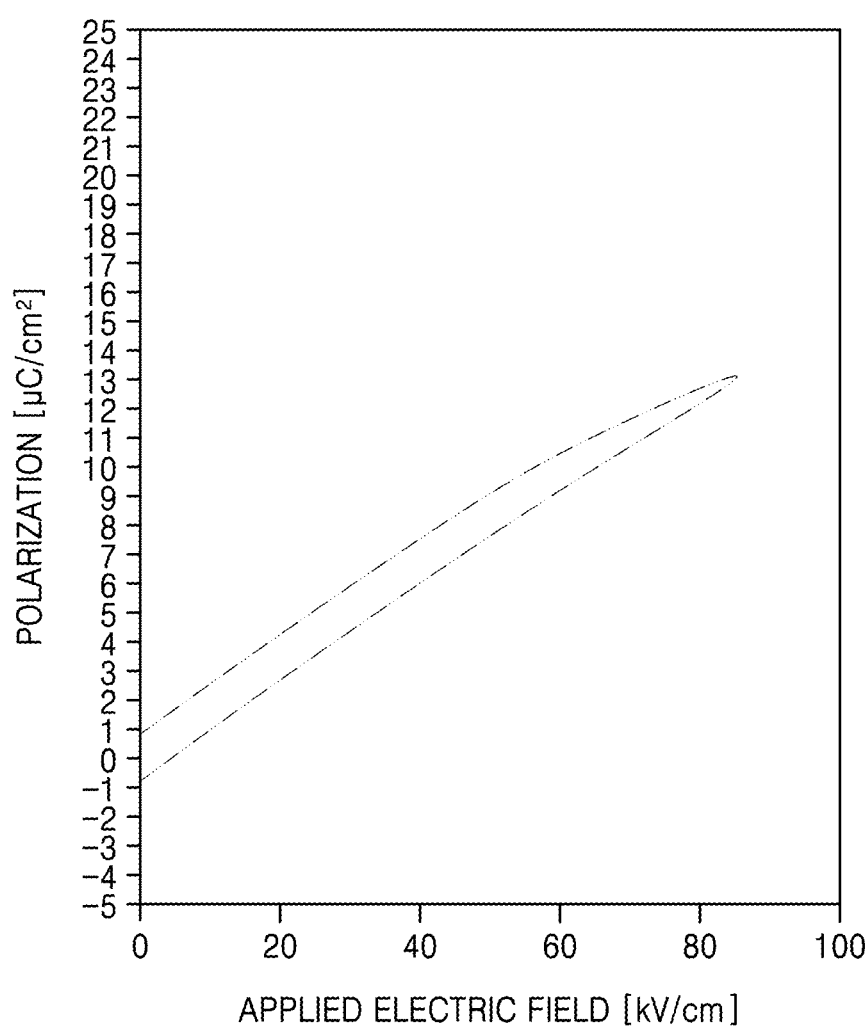

Referring to FIG. 5, $T_{max}$ of the dielectric material of Comparative Example 1 was 200° C., wherein $T_{max}$ indicates the temperature at which a dielectric material has a maximum permittivity.

On the other hand, $T_{max}$ values of the dielectric materials of Examples 1 to 4 were observed, respectively, at 155° C., –10° C., –40° C., and –55° C.

In order to identify the temperature coefficient of capacitance (TCC), capacitance was measured in a temperature control chamber from –55° C. to 125° C. at intervals of 5° C. in reference to X7S of EIA specification, and a part of the results is shown in Table 1. TCC is represented by the following Equation 1:

$$TCC(\%)=[(C-C_{RT}/C_{RT}]\times100, \qquad \text{[Equation 1]}$$

wherein C is a capacitance measured within a temperature range of –55° C. to 125° C., and $C_{RT}$ is a capacitance measured at 25° C.

TABLE 1

| Class | Composition | $T_{max}$ (° C.) | TCC (%) |
|---|---|---|---|
| Comparative Example 1 | $KnaSr_4Nb_{10}O_{30}$ | >200 | −13~8 |
| Example 1 | $K_{1.25}NaSr_{3.5}La_{0.25}Nb_{10}O_{30}$ | 155 | −2~15 |
| Example 2 | $K_{1.5}NaSr_3La_{0.5}Nb_{10}O_{30}$ | −10 | −15~7 |
| Example 3 | $K_{1.75}NaSr_{2.5}La_{0.75}Nb_{10}O_{30}$ | −40 | −39~25 |
| Example 4 | $K_2NaSr_2LaNb_{10}O_{30}$ | −55 | −40~39 |

Referring to FIG. 5 and Table 1, as an amount of La included in the dielectric materials of Examples 1 to 4 was increased, $T_{max}$ decreased. Among the specimens, the TCC of the dielectric materials of Examples 1 and 2 satisfied ±22% or less.

Evaluation Example 3: Polar Nano Region (PNR) Characteristics Evaluation

Silver (Ag) electrodes were applied on both sides of the dielectric pellets prepared in Comparative Example 1 and Examples 1 to 4 to prepare a specimen, and using Premier II Ferroelectric Tester (Radiant Technologies, inc.) the polarization behavior according to the change of an electric field at 25° C. was measured, and the results are shown, respectively in hysteresis loops of FIGS. 6A to 6E. For ease of reference, the line notation, illustrated, e.g., in the key of FIG. 5, is maintained in FIGS. 6A to 6E.

Referring to FIGS. 6A to 6E, in the dielectric materials of Examples 1 to 4, as an amount of La was increased, residual polarization (Pr) was reduced, and the electric field-polarization graph showed a linear curve shape in which the polarization is proportional to electric field. The dielectric materials of Examples 2 to 4 had a decreased Pr compared to the dielectric material of Comparative Example 1. This is construed to be due to an increase of nano domains that form PNRs as La content increased.

In addition, permittivity of the specimen where electrodes were formed on both sides was measured using a E4980A precision LCR meter (Keysight) in a temperature control chamber at temperatures from –55° C. to 200° C. with varying frequencies.

Figure 7A:
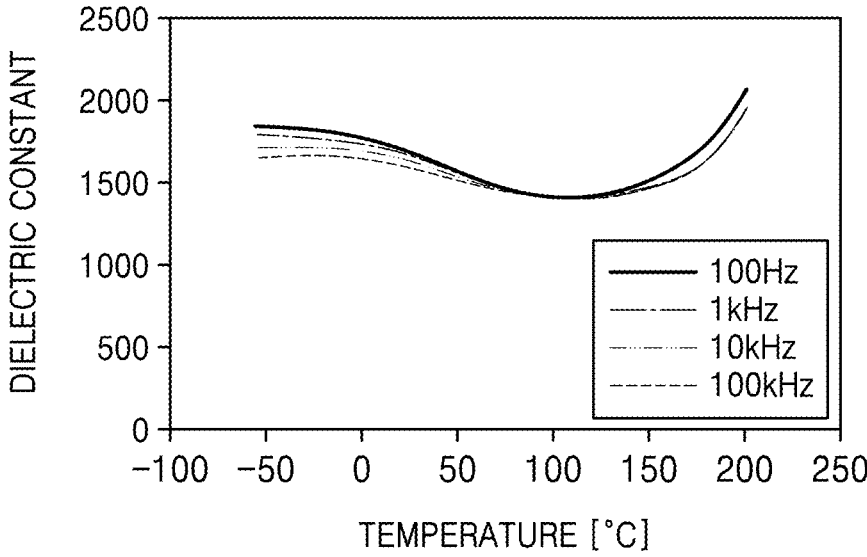
FIG. 7A to 7E are graphs that show changes in dielectric constant according to temperature and frequency of the dielectric materials of Comparative Example 1 and Examples 1 to 4.
Figure 7B:
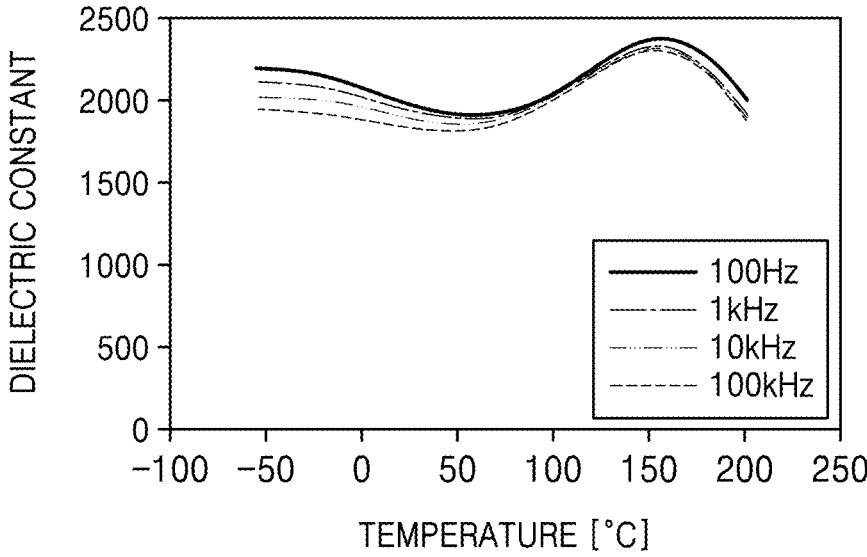
Figure 7C:
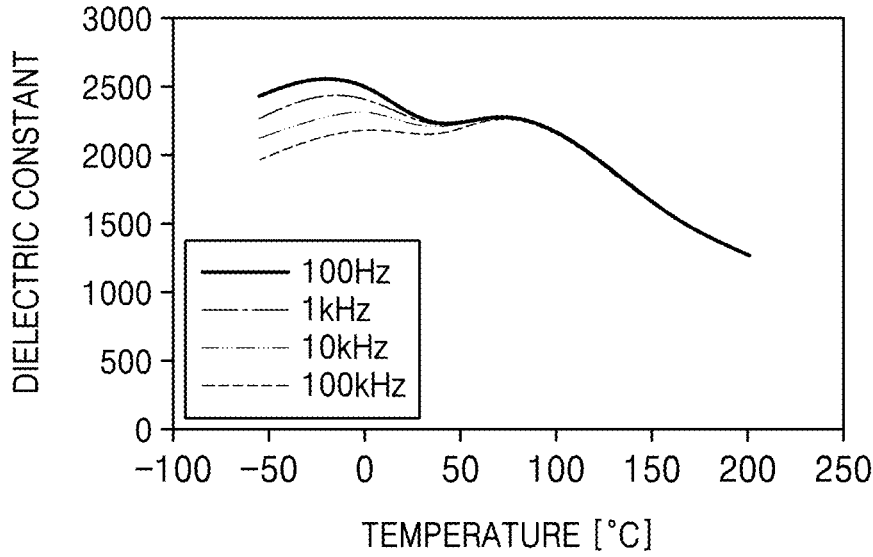
Figure 7D:
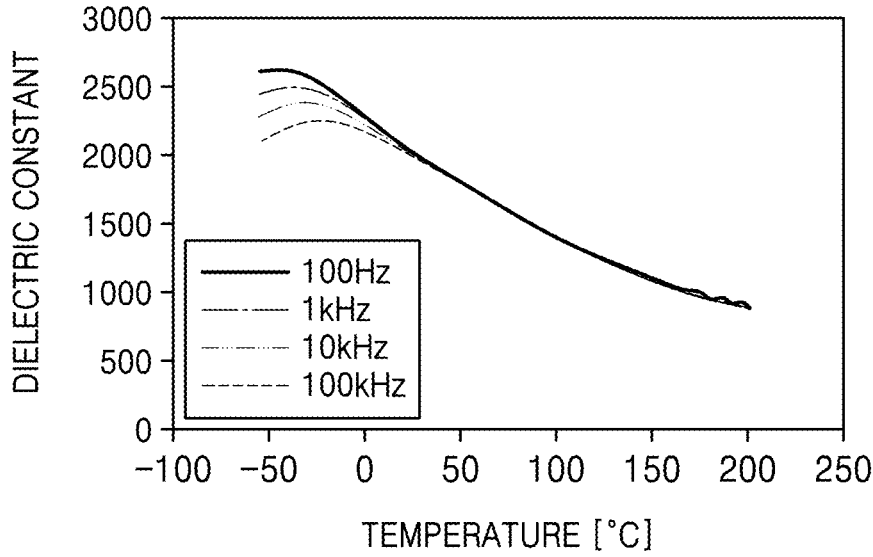
Figure 7E:
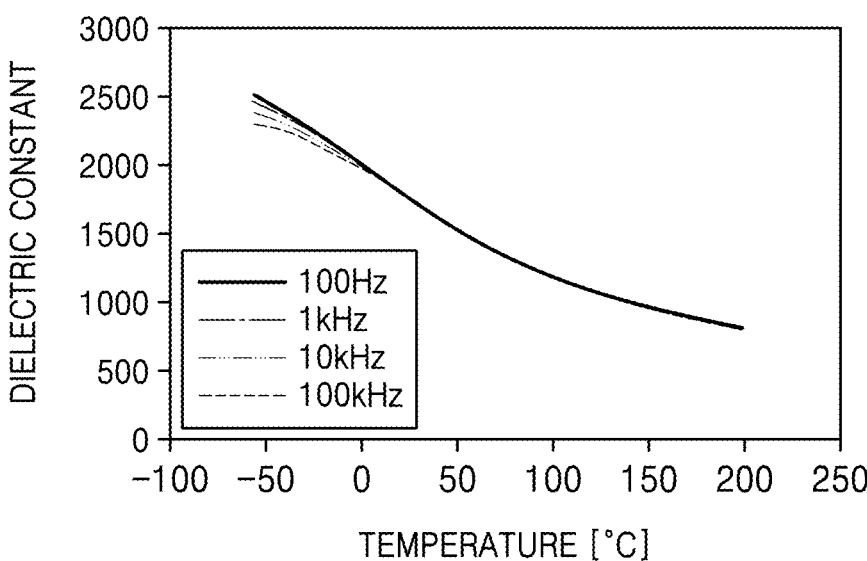

Dielectric constants obtained by multiplying the measured permittivity by a vacuum permittivity ($\varepsilon_0$) is shown in FIGS. 7A to 7E. FIG. 7A illustrates the dielectric constant curve compared to temperature of the Comparative Example 1, and FIGS. 7B to 7E illustrate, respectively, the dielectric constant curve compared to temperature of the Examples 1 to 4.

Referring to FIGS. 7A to 7E, the dielectric material of Comparative Example 1 did not show a change in $T_{max}$ according to the frequency, but only showed a little change according to the frequency of the low-temperature peak. On the other hand, the dielectric material of Example 1 did not show a change in $T_{max}$ according to the frequency, but showed larger change according to the frequency of the low temperature peak. In the dielectric materials of Examples 2 to 4, $T_{max}$ was changed according to the frequency, and the variance was large. It is construed that nano domains that form PNRs are increased as an increase of an amount of La in the dielectric materials of Examples 1 to 4, although PNR characteristics only rarely exist due to the complex structure of a mother compound $KnaSr_4Nb_{10}O_{30}$.

Evaluation Example 4: Evaluation of Dielectric Characteristics at Room Temperature Silver (Ag) electrodes were applied on both sides of the dielectric pellets prepared in Comparative Examples 1 to 3 and Examples 1 to 4 to prepare specimens, and using an E4980A Precision LCR Meter (Keysight), a nominal permittivity of the specimens with electrodes formed on both sides were measured at 25° C. at a frequency in a range of AC 1 V, 100 Hz, or 1 kHz, and the results are shown in Table 2 below. E is permittivity, tan δ represents loss tangent.

substitute Sr cations in the dielectric materials of Comparative Examples 2 to 3. Therefore, the structures of the dielectric materials of Examples 1 to 4 are more distorted compared with the structures of the dielectric materials of Comparative Examples 1 to 3. Without being limited to a particular theory, improved permittivity of dielectric materials of Examples 1 to 4 at room temperature is construed to be due to an increased formation of polar nano regions (PNR) according to an increase of structural distortion.

Evaluation Example 5: Evaluation of Dielectric Characteristics at room temperature under a high electric field.

Silver (Ag) electrodes were applied on both sides of the dielectric pellets prepared in Comparative Examples 1 to 3 and Examples 1 to 4 to prepare specimens, and a resistivity, a residual polarization, a vacuum permittivity ($\varepsilon_0$), an effective permittivity, and a dielectric loss tangent of the specimens with electrodes formed on both sides were measured at room temperature (25° C.) under a high electric field according to following methods, and the results are shown in Table 3.

(1) Resistivity

Using Premier II Ferroelectric Tester (Radiant Technologies, inc.) the resistivity of a specimen was measured for 1 second after it was stabilized for 60 seconds under a high electric field (8.7 V/μm) of applied DC.

(2) Residual Polarization (Pr)

TABLE 2

| | | Nominal Permittivity (1 V) | | | |
|---|---|---|---|---|---|
| | | 100 Hz | | 1 kHz | |
| Class | Composition | ε | tanδ | ε | tanδ |
| Comparative Example 1 | $KnaSr_4Nb_{10}O_{30}$ | 1330 | 0.012 | 1305 | 0.013 |
| Comparative Example 2 | $K_2NaSr_2NdNb_{10}O_{30}$ | 1522 | 0.011 | 1493 | 0.016 |
| Comparative Example 3 | $K_2NaSr_2SmNb_{10}O_{30}$ | 912 | 0.042 | 877 | 0.025 |
| Example 1 | $K_{1.25}NaSr_{3.5}La_{0.25}Nb_{10}O_{30}$ | 2145 | 0.026 | 2058 | 0.030 |
| Example 2 | $K_{1.5}NaSr_3La_{0.5}Nb_{10}O_{30}$ | 2566 | 0.014 | 2503 | 0.021 |
| Example 3 | $K_{1.75}NaSr_{2.5}La_{0.75}Nb_{10}O_{30}$ | 2302 | 0.002 | 2293 | 0.003 |
| Example 4 | $K_2NaSr_2LaNb_{10}O_{30}$ | 1584 | 0.014 | 1551 | 0.015 |

Referring to Table 2, nominal permittivity of the dielectric materials of Examples 1 to 4 were 1,550 or more, and they were higher than a nominal permittivity of Comparative Examples 1 to 3, showing that permittivity at room temperature was improved. Among them, a nominal permittivity of dielectric materials of Examples 1 to 3 were more than 2,000, showing much improved permittivity at room temperature.

This is construed to be due to the structural distortion of the dielectric of Examples 1 to 4. Specifically, the ion radius of $Sr^{+2}$ is 1.44 Å. When Sr cations located in A sites of the dielectric materials of Examples 1 to 4 are substituted with $La^{3+}$ and $K^{+1}$, the average ion radius is 1.5 Å, whereas Sr cations located in A sites of the dielectric materials of Comparative Examples 2 to 3 are substituted with $Nd^{3+}$ and $K^{+1}$ or $Sm^{3+}$ and $K^{+1}$, the average ion radii are 1.455 Å and 1.44 Å, respectively. That is, the average ion radius of $La^{3+}$ and $K^{+1}$ that substitute Sr cations in the dielectric materials of Examples 1 to 4 are bigger than the ion radius of $Sr^{+2}$ and the average ion radii of $Nd^{3+}$ and $K^{+1}$ or $Sm^{3+}$ and $K^{+1}$ that Using Premier II Ferroelectric Tester (Radiant Technologies, inc.) polarization behavior of a specimen was measured under a standard unipolar condition at a frequency of 100 Hz from 0 V/μm to 8.7 V/μm, and a residual polarization is obtained from a hysteresis loop of the polarization behavior.

(3) Vacuum Permittivity ($\varepsilon_0$), Effective Permittivity (ε), and Dielectric Loss Tangent ($\Delta\varepsilon/\varepsilon_0$)

Using Premier II Ferroelectric Tester (Radiant Technologies, inc.) a vacuum permittivity, an effective permittivity, and a dielectric loss tangent were measured, under an electric field of 0 V/μm or 8.7 V/μm of applied DC, using AC of an electric field of 87 mV/μm and a frequency of 1 kHz.

Dielectric loss tangent ($\Delta\varepsilon/\varepsilon_0$) is represented by Equation 2 below. The values (%) shown in Table 3 are dielectric loss tangent times 100.

$$\Delta\varepsilon/\varepsilon_0 = (\varepsilon - \varepsilon_0)/\varepsilon_0, \qquad \text{[Equation 2]}$$

wherein ε is permittivity when dc=8.7 V/μm, that is, an effective permittivity, and ε0 is permittivity when dc=0 V/μm.

TABLE 3

| | | | $\varepsilon_{dc}$(@1 kHz, AC = 87 mV/um) | | |
| Class | Resistivity ($\Omega$ cm) @8.7 V/$\mu$m | Pr ($\mu$C/cm$^2$) | $\varepsilon_0$ (@dc = 0 V/$\mu$m) | $\varepsilon$ (@dc = 8.7 V/$\mu$m) | $\Delta\varepsilon/\varepsilon_0$ |
|---|---|---|---|---|---|
| Comparative Example 1 KnaSr$_4$Nb$_{10}$O$_{30}$ | 1.2E+13 | 5.71 | 1373 | 837 | −39% |
| Comparative Example 2 K$_2$NaSr$_2$NdNb$_{10}$O$_{30}$ | 1.3E+12 | 0.79 | 1400 | 922 | −34% |
| Comparative Example 3 K$_2$NaSr$_2$SmNb$_{10}$O$_{30}$ | 6.4E+08 | 0.64 | 898 | 703 | −22% |
| Example 1 K$_{1.25}$NaSr$_{3.5}$La$_{0.25}$Nb$_{10}$O$_{30}$ | 2.0E+12 | 7.49 | 2084 | 994 | −52% |
| Example 2 K$_{1.5}$NaSr$_3$La$_{0.5}$Nb$_{10}$O$_{30}$ | 5.1E+12 | 2.52 | 2259 | 1093 | −52% |
| Example 3 K$_{1.75}$NaSr$_{2.5}$La$_{0.75}$Nb$_{10}$O$_{30}$ | 2.9E+12 | 2.20 | 2444 | 1155 | −53% |
| Example 4 K$_2$NaSr$_2$LaNb$_{10}$O$_{30}$ | 1.3E+12 | 0.79 | 1745 | 1108 | −37% |

Referring to Table 3, the resistivity of the dielectric materials of Examples 1 to 4 was greater than 1.0 E+12. The dielectric materials of Examples 2 to 4 had a decreased residual polarization (Pr) compared to the dielectric material of Comparative Example 1. An effective permittivity of dielectric materials of Examples 2 to 4 is 1,000 or more at room temperature under a high electric field, and is more than an effective permittivity of dielectric materials of Comparative Examples 1 to 3, showing an improved effective permittivity. Without being limited to a particular theory, this also is construed to be due to an increased formation of polar nano regions (PNR) according to an increase of structural distortion of the dielectric materials of Examples 1 to 4.

Evaluation Example 5: Evaluation of Dielectric Characteristics at a High Temperature Under a High Electric Field Silver (Ag) electrodes were applied on both sides of the dielectric pellets prepared in Examples 1 and 2 to prepare specimens, a resistivity, a residual polarization (Pr), a vacuum permittivity ($\varepsilon_0$), an effective permittivity, and a dielectric loss tangent of the specimens at a high temperature (125° C.) under a high electric field were measured and evaluated in the same manner as in Evaluation Example 4, and the results are shown in Table 4.

and 2 was 1,100 or more, showing much improved effective permittivity at a high temperature under a high electric field.

Evaluation Example 6: Dielectric Properties of Dielectric Materials Heat-Treated of Reduction and Re-Oxidization The molded article, which is an intermediate product of the dielectric materials prepared in Examples 1 and 2, was subjected to be reduced by a heat-treatment at 1300° C. for 2 hours under an atmosphere where N$_2$ and H$_2$ are mixed (volume ratio=99:1), and then a subsequent heat-treatment was performed at about 1,000° C. for 2 hours under N$_2$ atmosphere to re-oxidize the product to prepare each dielectric materials. Silver (Ag) electrodes were applied on both sides of the dielectric pellets to prepare specimens, and a resistivity, a vacuum permittivity ($\varepsilon_0$), an effective permittivity, and a dielectric loss tangent of the specimens at room temperature (25° C.) and a high temperature (125° C.) under a high electric field were measured according to each temperature and evaluated in the same manner as in Evaluation Example 4, and the results are shown in Table 5 and FIG. 6. Temperature coefficient of capacitance(TCC) was evaluated in the same manner as in Evaluation Example 2, and the results are shown in Table 7.

TABLE 4

| | @125° C. | | | | |
| | | | $\varepsilon_{dc}$(@1 kHz, AC = 87 mV/um) | | |
| Class | Resistivity ($\Omega$ cm) @8.7 V/$\mu$m | Pr ($\mu$C/cm$^2$) | $\varepsilon_0$ (@dc = 0 V/$\mu$m) | $\varepsilon$ (@dc = 8.7 V/$\mu$m) | $\Delta\varepsilon/\varepsilon_0$ |
|---|---|---|---|---|---|
| Example 1 K$_{1.25}$NaSr$_{3.5}$La$_{0.25}$Nb$_{10}$O$_{30}$ | 6.8E+11 | 2.52 | 2425 | 1130 | −53% |
| Example 2 K$_{1.5}$NaSr$_3$La$_{0.5}$Nb$_{10}$O$_{30}$ | 8.6E+11 | 0.98 | 2265 | 1149 | −49% |

Referring to Table 4, the resistivity of the dielectric materials of Examples 1 to 4 was higher than 1.0 E+11. An effective permittivity of dielectric materials of Examples 1

TABLE 5

| | @25° C. | | | |
| | | $\varepsilon_{dc}$(@1 kHz, AC = 87 mV/um) | | |
| Class | Resistivity ($\Omega$ cm) @8.7 V/$\mu$m | $\varepsilon_0$ (@dc = 0 V/$\mu$m) | $\varepsilon$ (@dc = 8.7 V/$\mu$m) | $\Delta\varepsilon/\varepsilon_0$ |
|---|---|---|---|---|
| Example 1 $K_{1.25}NaSr_{3.5}La_{0.25}Nb_{10}O_{30}$ | 4.0E+12 | 1720 | 958 | −44% |
| Example 2 $K_{1.5}NaSr_3La_{0.5}Nb_{10}O_{30}$ | 1.3E+13 | 2244 | 1041 | −54% |

TABLE 6

| | @125° C. | | | |
| | | $\varepsilon_{dc}$(@1 kHz, AC = 87 mV/um) | | |
| Class | Resistivity ($\Omega$ cm) @8.7 V/$\mu$m | $\varepsilon_0$ (@dc = 0 V/$\mu$m) | $\varepsilon$ (@dc = 8.7 V/$\mu$m) | $\Delta\varepsilon/\varepsilon_0$ |
|---|---|---|---|---|
| Example 1 $K_{1.25}NaSr_{3.5}La_{0.25}Nb_{10}O_{30}$ | 5.7E+10 | 1615 | 946 | −41% |
| Example 2 $K_{1.5}NaSr_3La_{0.5}Nb_{10}O_{30}$ | 5.4E+10 | 2136 | 1031 | −52% |

Referring to Tables 5 and 6, the resistivity of the dielectric materials of Examples 1 and 2 was 1.0 E+12 or more at room temperature under a high electric field. An effective permittivity of the dielectric material of Example 2 was 1,000 or more at room temperature and a high temperature under a high electric field, and was shown to be much improved.

TABLE 7

| Class | Composition | Tma (° C.) | TCC (%) |
|---|---|---|---|
| Example 1 | $K_{1.25}NaSr_{3.5}La_{0.25}Nb_{10}O_{30}$ | 175 | −10~11 |
| Example 2 | $K_{1.5}NaSr_3La_{0.5}Nb_{10}O_{30}$ | 10 | −7~5 |

Referring to Table 7, $T_{max}$ was shown to be decreased as the La content included in the dielectric materials of Examples 1 and 2 decreased, and TCC satisfied ±22%. The dielectric materials of Examples 1 and 2 were confirmed to have stable temperature characteristics of permittivity.

From this, the dielectric materials of Examples 1 and 2 were shown to be reduction-resistant and oxidation-resistant, have a high effective permittivity at room temperature and a high temperature under a high electric field, and have a stable temperature characteristics of permittivity. Thus, they are suitable for use in a dielectric layer of a multi-layered capacitor that has Ni as a main component of an internal electrode, and may be used in a high temperature multi-layered ceramic capacitor (MLCC) for vehicles or special purposes.

A dielectric material, according to some example embodiments, includes the compound $K_{1-x}NaSr_{4-2x}La_xNb_{10}O_{30}$, wherein 0<x<2. The compound $K_{1+x}NaSr_{4-2x}La_xNb_{10}O_{30}$ has a tungsten-bronze crystal structure wherein Sr cation in an A site is substituted with La with a valence electron number of +3, and K with a valence electron number of +1. The compound $K_{1+x}NaSr_{4-2x}La_xNb_{10}O_{30}$ has an improved permittivity under a high electric field at room temperature and a high temperature, shows a stable temperature properties of permittivity, and retains an equivalent level of dielectric and temperature characteristics even when used under a redox atmosphere in a device.

The dielectric material including the compound $K_{1+x}NaSr_{4-2x}La_xNb_{10}O_{30}$ may be applied in a high temperature MLCC for vehicles or special purposes, and may provide a highly efficient device having dielectric layers made into thinner films, as it functions effectively under a high electric field at room temperature and a high temperature.

It should be understood that the example embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:
1. A dielectric material comprising:
a compound represented by Formula 1:

$$K_{1+x}NaSr_{4-2x}La_xNb_{10}O_{30}, \hspace{2cm} \text{Formula 1}$$

wherein 0<x<2.
2. The dielectric material of claim 1, wherein 0<x≤1.
3. The dielectric material of claim 1, wherein 0<x≤0.5.
4. The dielectric material of claim 1, wherein the compound includes a tungsten-bronze crystal structure.
5. The dielectric material of claim 1, wherein the compound includes
a tungsten-bronze crystal structure of $KNaSr_4Nb_{10}O_{30}$, and
a structure in which a Sr cation located in an A site in a unit lattice of the $KNaSr_4Nb_{10}O_{30}$ is substituted with $La^{3+}$ as a donor and $K^{+1}$ as an acceptor.
6. The dielectric material of claim 1, wherein the compound has a tetragonal crystal structure.
7. The dielectric material of claim 1, wherein a size of a unit lattice of the compound is increased compared to a size of a unit lattice of $KNaSr_4Nb_{10}O_{30}$.
8. The dielectric material of claim 1, wherein
the compound includes at least one of
$K_{1.01}NaSr_{3.98}La_{0.01}Nb_{10}O_{30}$,
$K_{1.05}NaSr_{3.9}La_{0.05}Nb_{10}O_{30}$, $K_{1.1}NaSr_{3.8}La_{0.1}Nb_{10}O_{30}$,
$K_{1.15}NaSr_{3.7}La_{0.15}Nb_{10}O_{30}$, $K_{1.2}NaSr_{3.6}La_{0.2}Nb_{10}O_{30}$,
$K_{1.25}NaSr_{3.5}La_{0.25}Nb_{10}O_{30}$, $K_{1.3}NaSr_{3.4}La_{0.3}Nb_{10}O_{30}$,
$K_{1.35}NaSr_{3.3}La_{0.35}Nb_{10}O_{30}$, $K_{1.4}NaSr_{3.2}La_{0.4}Nb_{10}O_{30}$,
$K_{1.45}NaSr_{3.1}La_{0.45}Nb_{10}O_{30}$, $K_{1.5}NaSr_3La_{0.5}Nb_{10}O_{30}$, $K_{1.55}NaSr_{2.9}La_{0.55}Nb_{10}O_{30}$, $K_{1.6}NaSr_{2.8}La_{0.6}Nb_{10}O_{30}$, $K_{1.65}NaSr_{2.7}La_{0.65}Nb_{10}O_{30}$, $K_{1.7}NaSr_{2.6}La_{0.7}Nb_{10}O_{30}$, $K_{1.75}NaSr_{2.5}La_{0.75}Nb_{10}O_{30}$, $K_{1.8}NaSr_{2.4}La_{0.8}Nb_{10}O_{30}$, $K_{1.85}NaSr_{2.3}La_{0.85}Nb_{10}O_{30}$, $K_{1.9}NaSr_{2.2}La_{0.9}Nb_{10}O_{30}$, $K_{1.95}NaSr_{2.1}La_{0.95}Nb_{10}O_{30}$, $K_2NaSr_2LaNb_{10}O_{30}$, $K_{2.05}NaSr_{1.9}La_{1.05}Nb_{10}O_{30}$, $K_{2.1}NaSr_{1.8}La_{1.1}Nb_{10}O_{30}$, $K_{2.15}NaSr_{1.7}La_{1.15}Nb_{10}O_{30}$, $K_{2.2}NaSr_{1.6}La_{1.2}Nb_{10}O_{30}$, or $K_{2.25}NaSr_{1.8}La_{1.25}Nb_{10}O_{30}$.

9. The dielectric material of claim 1, wherein an electric field-polarization graph of the dielectric material has a linear curve shape in which, as an amount of La is increased, residual polarization (Pr) is reduced and in which the polarization is proportional to an applied electric field.

10. The dielectric material of claim 1, wherein a maximum permittivity of the dielectric material, at 1 kHz, is within a range of 1,000 to 2,600.

11. The dielectric material of claim 1, wherein in a graph showing changes in permittivity according to temperature of the dielectric material, as an amount of La is increased, a temperature ($T_{max}$) at which the dielectric material has maximum permittivity is decreased.

12. The dielectric material of claim 1, wherein
the dielectric material is a solid solution including polar nano regions (PNR).

13. The dielectric material of claim 12, wherein
the PNR include defect clusters in which a Sr cation located in an A site in a unit lattice of $KNaSr_4Nb_{10}O_{30}$ is substituted with $La^{3+}$ as a donor, and $K^{+1}$ as an acceptor.

14. A device comprising:
a plurality of electrodes; and
at least one dielectric layer between the plurality of electrodes, the at least one dielectric layer including the dielectric material of claim 1.

15. The device of claim 14, wherein
the device is a multi-layered capacitor,
the plurality of electrodes includes a plurality of internal electrodes,
the at least one dielectric layer includes dielectric layers alternately arranged between the plurality of internal electrodes.

16. The device of claim 15, wherein a main component of the plurality of internal electrodes is nickel.

17. The device of claim 14, wherein a maximum permittivity of the at least one dielectric layer, at 1 kHz, is within a range of 1,000 to 2,600.

18. The device of claim 14, wherein a resistivity of the at least one dielectric layer is within a range of 1.0 E+11 Ωcm to 1.0 E+14 Ωcm.

19. The device of claim 14, wherein an effective permittivity of the at least one dielectric layer at room temperature and 125° C. when 8.7 V/μm of DC bias is applied is within a range of 1,000 to 1,150.

20. An electronic device comprising:
a capacitor; and
a transistor,
wherein at least one of the capacitor or the transistor includes the device of claim 14.

21. A method of manufacturing a dielectric material, the method comprising:
mechanically milling a mixture of potassium salts, sodium salts, strontium salts, niobium compounds, and lanthanum compounds; and
heat-treating the mixture under an oxidizing atmosphere,
wherein the dielectric material includes a compound represented by the following Formula 1

$$K_{1+x}NaSr_{4-2x}La_xNb_{10}O_{30}, \qquad \text{Formula 1}$$

wherein 0<x<2.

22. The method of claim 21, wherein the heat-treating is performed within a range of 900° C. to 1,200° C.

23. The method of claim 21, further comprising:
obtaining a molded article by molding a product of the heat-treating; and
performing a second heat-treatment on the molded article.

24. The method of claim 23, wherein the second heat-treatment is performed within a range of 1,200° C. to 1,500° C.

25. The method of claim 21, wherein the heat-treating the mixture oxidizes the mixture.

* * * * *